(12) United States Patent
Veiseh

(10) Patent No.: US 11,161,680 B2
(45) Date of Patent: Nov. 2, 2021

(54) RECYCLABLE CELLULOSE BASED INSULATED LINER

(71) Applicant: SIMPLE CONTAINER SOLUTIONS, INC., Rancho Dominguez, CA (US)

(72) Inventor: Charles S. Veiseh, Los Angeles, CA (US)

(73) Assignee: SIMPLE CONTAINER SOLUTIONS, INC., Rancho Dominguez, CA (US)

( * ) Notice: Subject to any disclaimer, the term of this patent is extended or adjusted under 35 U.S.C. 154(b) by 0 days.

(21) Appl. No.: 16/746,079

(22) Filed: Jan. 17, 2020

(65) Prior Publication Data

US 2020/0231365 A1 Jul. 23, 2020

Related U.S. Application Data

(60) Provisional application No. 62/794,354, filed on Jan. 18, 2019.

(51) Int. Cl.
*B65D 81/38* (2006.01)
*B65D 25/16* (2006.01)
*B65D 65/38* (2006.01)

(52) U.S. Cl.
CPC ......... *B65D 81/3876* (2013.01); *B65D 25/16* (2013.01); *B65D 65/38* (2013.01); *B65D 2565/385* (2013.01)

(58) Field of Classification Search
CPC .... B65D 81/3876; B65D 25/16; B65D 65/18; B65D 2565/385; B65D 5/5066; B65D 85/30; B65D 85/6837

USPC ....... 383/20; 206/524.8, 499, 523, 594, 321, 206/583, 592

See application file for complete search history.

(56) References Cited

U.S. PATENT DOCUMENTS

| | | | | |
|---|---|---|---|---|
| 5,487,470 A * | 1/1996 | Pharo | ................... | B65D 81/052 206/521 |
| 9,139,319 B2 * | 9/2015 | Crespo | ................... | B65B 55/00 |
| 9,499,325 B2 * | 11/2016 | Liao | ..................... | B65D 81/052 |
| 10,816,128 B2 | 10/2020 | McGoff et al. | | |
| 2018/0229917 A1 * | 8/2018 | Jobe | ........................ | B32B 9/04 |

OTHER PUBLICATIONS

Geffertova et al, Technical University in Zvolen, Faculty of Wood Sciences and Technology, Mar. 2012, www.intechopen.com, p. 270-275.

* cited by examiner

*Primary Examiner* — King M Chu
(74) *Attorney, Agent, or Firm* — Dilworth IP, LLC

(57) ABSTRACT

A recyclable expandable insulating liner comprising:
a web of multilayer cellulose-based material configured to form a one-piece box shape when expanded, comprising four side panels and a bottom panel, wherein each side panel is connected to adjacent side panels and the bottom panel, and at least one of the side panels comprise an intra-panel connection line connecting two sections of the panel.

9 Claims, 20 Drawing Sheets

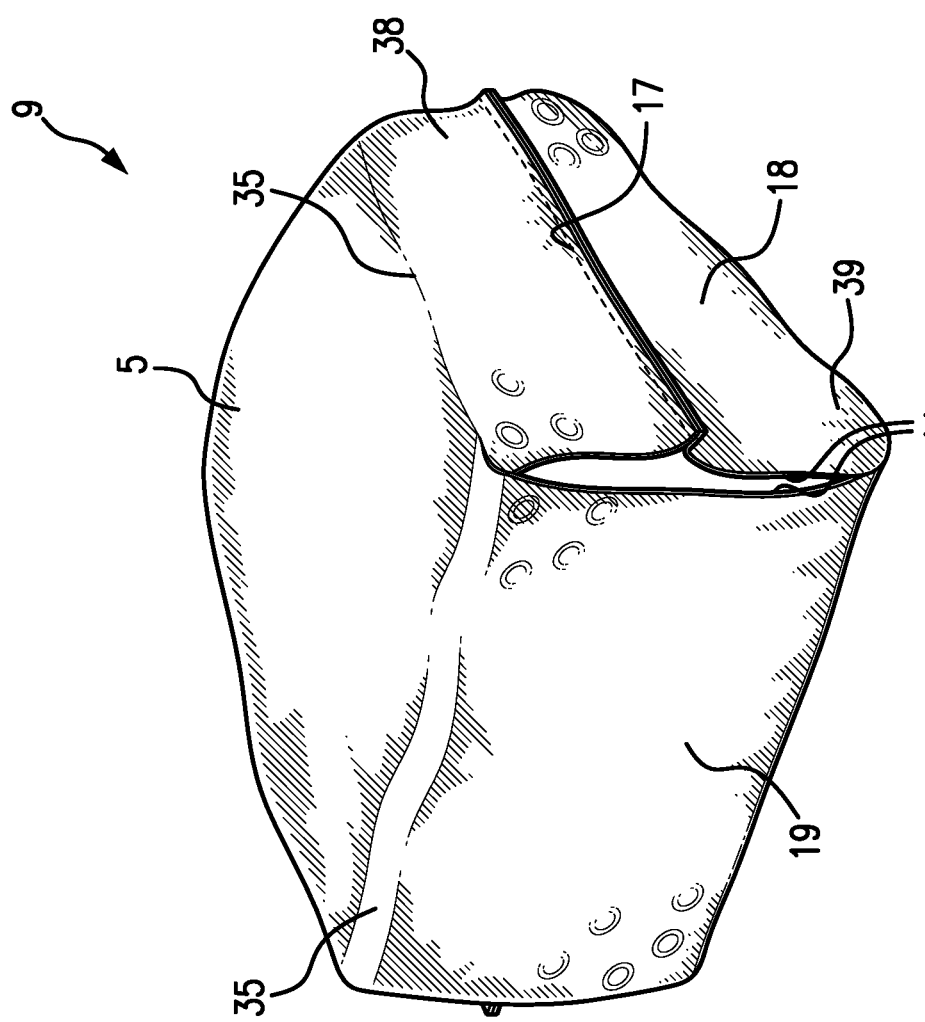

RECYCLABLE CELLULOSE BASED INSULATED LINER

FIELD OF THE INVENTION

The present invention relates to recyclable articles. In particular, the present invention relates to a one piece recyclable bag for insulating the lining of shipping boxes and its method of manufacture.

BACKGROUND

The current state of the art for cellulose type insulated packaging includes multi-panel insulated liners, also known as A/B panels, that are utilized to line the interior of a six-sided carton. Individual panels of such liners can be manufactured by enclosing recycled paper material such as macerated newsprint inside sheets of other paper material, to create multiple panels that can be used to line the six sides of a corrugated box. An example of such a product is Tempguard by Sealed Air Incorporated of Charlotte N.C. Although these panels provide insulation, they are difficult to manufacture in that in order to produce the proper size panels, macerated newsprint must be deposited between two layers of paper material, which are then connected at the periphery to hold the newsprint. Such a task is difficult since connected areas cannot hold any of the recycled newsprint, as they would not allow adhesion. As a result, custom set ups and possible custom size rolls of wrapping paper material must be utilized for each desired size of product. This can be a very tedious and expensive process due to the time-intensive set up method and costs associated with it. Additionally, since the macerated newsprint contains a great amount of dust in addition to fibers, in the event the panels are ever torn, the leaking fibers can contaminate the surroundings and the contents of the packaged items they are being used to protect.

More importantly, although such products are labeled as recyclable, some recyclers may find them undesirable due to the quality of the fiber material they provide, where macerated newsprint incorporates a low quality, short fiber material that is suboptimal for the creation of downstream paper goods of premium strength.

U.S. Pat. No. 9,139,319 describes attempts at utilizing sheets of multi-layer cellulosic materials to insulate the heat or cold sensitive contents packed inside a shipping carton; however, because such materials are manufactured in sheet form, articles produced with this material have been difficult to use in that they do not easily or efficiently conform to the inside dimensions of a shipping carton, are not easily or quickly installed in a carton, nor do they provide adequate closure mechanisms. Additionally, since the prior art discloses the use of sheets of the material, the seams or corners are not fully closed, and are only over-lapped with one another, allowing the entry or escape of heat.

BRIEF DESCRIPTION OF THE DRAWINGS

The subject matter of the present disclosure will be more fully understood from the following detailed description, taken in connection with the accompanying drawings, in which:

FIG. 5A shows a perspective view of a folded sheet of the multilayer cellulose material as in FIG. 2 with corner portions removed, that has been expanded in order to join the resulting free bottom edge and side bottom edge to form a connected bottom edge of a bag.

SUMMARY OF THE INVENTION

The subject matter of the present disclosure relates to protective articles manufactured using multilayer cellulosic material insulation material and methods for their manufacture.

In one embodiment, the present disclosure provides a recyclable expandable insulating liner comprising a web of multilayer cellulose-based material configured to form a one-piece box shape when expanded, comprising four side panels and a bottom panel, wherein each side panel is connected to adjacent side panels and the bottom panel, and at least one of the side panels comprise an intra-panel connection line connecting two sections of the panel.

Figure 5B:
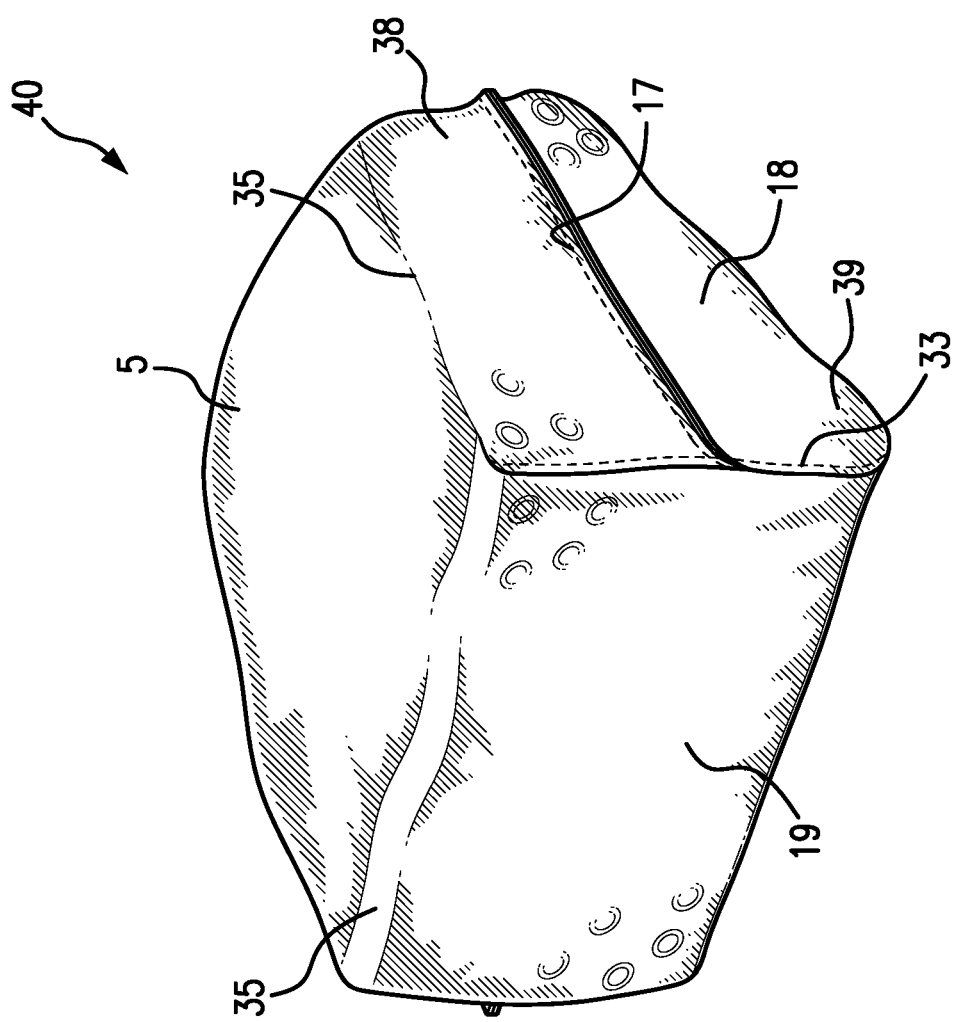
FIG. 5B shows the liner of FIG. 5A where the free edges have been connected to form a connected edge.

In another embodiment, the present disclosure provides a process to produce a recyclable insulating liner, the process comprising folding a web of cellulosic material in half, thereby forming a folded web comprising two side edges a top edge and a bottom folded edge; connecting at least one of the two side edges along an intra-panel connection line to form a pouch comprising two bottom corner portions; cutting out a parallelogram-shaped section in each of the two bottom corner portions, thereby forming a cut pouch comprising two unconnected bottom corner sections comprising free edges; and expanding the cut pouch and connecting the free edges of both unconnected bottom corner sections to form straight edges, e.g., as shown in FIGS. 5A & 5B.

Preferably, two of the side edges are connected along an intra-panel connection line to form the pouch comprising two bottom corner portions.

In another embodiment the present disclosure provides a process to produce a recyclable insulating liner, the process comprising folding a web of cellulosic material in half, thereby forming a folded web comprising first and second side edges, a top edge and a folded bottom edge, the top edge and folded bottom edge being opposite one another; connecting at least one side edge along an intra-panel connection line, thereby forming a pouch; expanding the liner, thereby forming an expanded liner comprising four side panels and a bottom panel, each of the side panels being connected to the bottom panel and adjacent panels, wherein the at least one intra-panel connection line is located in a side panel comprising a side panel lower portion and side panel upper portion; forming a first triangular pointed section comprising a base and an apex from the lower portion of a first side panel and contacting the first triangular pointed section with the side panel; forming a second triangular pointed section comprising a base and an apex from the lower portion of a second side panel and contacting the second triangular pointed section with the side panel.

Preferably, two side edges are connected along intra-panel connection lines, the intra-panel connection lines being located in two side panels opposite one another, and the first and second triangular pointed sections are attached to the side panels opposite one another.

In another embodiment the present disclosure provides a process to produce a recyclable liner, the process comprising folding a web of cellulosic material in half, thereby forming a folded web comprising first and second side edges, a top edge and a folded bottom edge, the top edge and folded bottom edge being opposite one another; connecting at least one side edge along an intra-panel connection line, thereby forming a pouch; expanding the liner, thereby forming an expanded liner comprising four side panels and a bottom panel, each of the side panels being connected to the bottom panel and adjacent panels, wherein the intra-panel connection line is located in a side panel comprising a lower portion and an upper portion; forming a first triangular pointed section comprising a base and an apex from the lower portion of a first side panel, and detaching the first triangular pointed section from the pouch at its base thereby forming free edges; forming a second triangular pointed section comprising a base and an apex from the lower portion of a second side panel, and detaching the second triangular pointed section from the pouch at its base, thereby forming free edges, and connecting the free edges of the side panels.

Preferably, two side edges are connected along intra-panel connection lines, the intra-panel connection lines being located in two side panels opposite one another, and the first and second triangular pointed sections are attached to the side panels opposite one another.

In another embodiment the present disclosure provides a process to produce a recyclable thermally insulating and cushioning pouch, the process comprising: folding a web of cellulosic material in half, thereby forming a folded web comprising two side edges, a top edge and a bottom folded edge; and connecting the two sides.

In still another embodiment the present disclosure provides a pouch made by a process comprising: folding a web of cellulosic material in half, thereby forming a folded web comprising two side edges, a top edge and a bottom folded edge; and connecting the two sides. Such an article can include an extended lip for closure purposes, with or without a fastening device. Such a pouch can also be manufactured using two or more layers of unconnected multilayer cellulose material that are segmented and connected on three sides, leaving one unconnected side.

The insulating liners described in this specification can be utilized inside a corrugated shipping carton, or other shipping device specifically as a liner, or singularly, i.e., "as is" to function as a bag. When it is used singularly as a bag, a carrying handle can be fashioned by removing a portion of the article to allow a hand hole to be formed. This hand hole can be strengthened to prevent tearing using a strengthening layer of material.

DETAILED DESCRIPTION OF THE INVENTION

The following are features of the invention, including a description of the materials it is constructed of, the method by which it is converted into a carton liner, and its closure method.

In one embodiment the present disclosure provides an provides a recyclable expandable insulating liner comprising a web of multilayer cellulose-based material configured to form a one-piece box shape when expanded, comprising four side panels and a bottom panel, wherein each side panel is connected to adjacent side panels and the bottom panel, and at least one of the side panels comprises an intra-panel connection line connecting two sections of the panel.

Preferably, two of the side panels comprise an intra-panel connection line and the two side panels are opposite one another.

Figure 9:
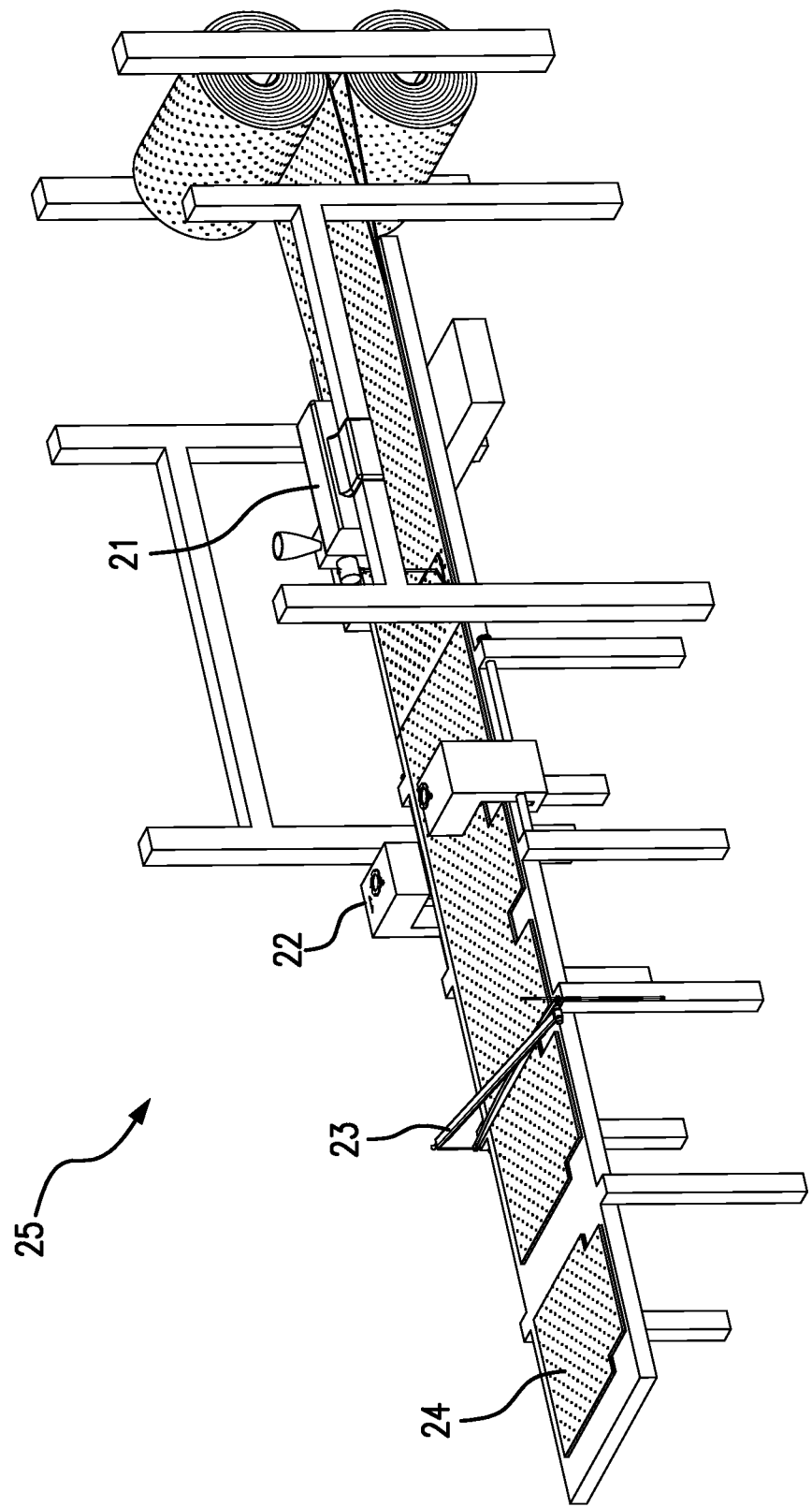
FIG. 9 shows the multilayer cellulose material in FIG. 8 in a first proposed converting method yielding pouches of the same material with some edges connected and portions removed.
Figure 10:
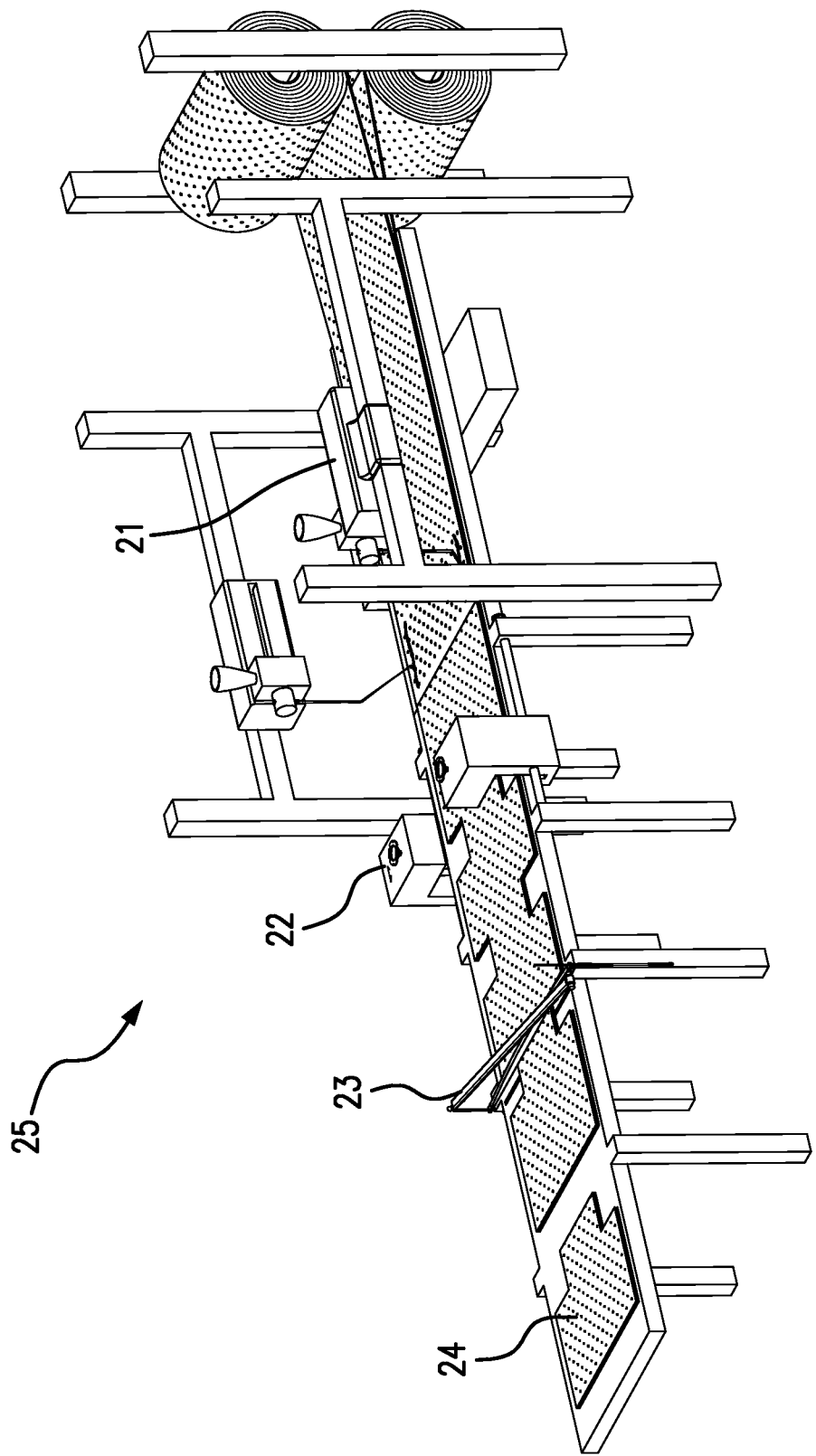
FIG. 10 shows the multilayer cellulose material as in FIG. 8 in a second converting method yielding pouches of the same material with some edges connected and portions removed.

The web of the cellulose-based material is formed by either folding a layer of the cellulose-based material upon itself in the manufacturing process, or two layers are joined, as shown in FIGS. 9 and 10. In both cases, parallel sides of the web are connected at their edges by sewing, taping or through use of adhesives or gluing, preferably by sewing or taping, more preferably by sewing. When two separate layers of the web are joined during manufacture, the bottom edges will also be connected as described above to form an intra bottom panel connection running substantially from one side panel to the other. In this way, all panels of the expanded liner are connected with adjacent panels and the bottom panel, since they are directly connected by being part of the same continuous web. For example, in FIG. 5A the front side panel (front side) and bottom side panel are part of the same continuous web of material.

Such an insulating box liner exemplifies a versatility of assembly and efficiency in its use of materials superior to conventional containers, in addition to its advantages from an environmental standpoint. Unlike such conventional containers, the liner disclosed in this specification utilizes a single web of material to construct the entire liner rather than combining multiple separate materials in its fabrication process. It does not utilize outside materials to construct the liner walls except for adhesives or fastening devices, nor are portions cut from the web and reattached. In fact, the edges of the container, i.e., where the panel sides meet each other are formed by folding of the web in various ways, or by applying an adhesive or a fastening device to unconnected edges. Another advantage of the inventive design of these liners is their optimal insulation properties. Because many of the edges are simply folds in the material, there is no gap through which air can easily infiltrate. For the rest of the edges, the seam formed between the two edges has a very small seam gap, i.e., the distance between the adjacent edges. Preferably, this is no greater than 1.5 mm; more preferably, no greater than 1.0 mm. The seam gap is secured by adhesive or fastening device. Thus, the inventive liners described in this specification offer improved insulation properties due to a reduction in air leakage through seams, i.e., the assembly as a whole is of tighter design from a leakage standpoint. This improvement in insulation properties is accomplished without the use of heat sealing materials to seal the edges and panels of the inventive liner. The use of such heat sealing materials to seal the edges and panels would adversely affect the recyclability of the liner. Such heat sealable materials include thermoplastic materials, either with our without plasticizers, including polyethylenes (low density polyethylene, LDPE, linear low density polyethylene, LLDPE, and high density polyethylene, HDPE; polypropylene material and polyvinyl chloride, PVC. Heat sealable, water soluble plastics such as polyvinyl alcohol or PVOH that do not interfere with the recycling stream can be used by attaching them to the layers of tissue or paper.

The liners of the current subject matter are of one-piece construction. For the purpose of this specification, the term one-piece or unitary means an article that can be used to line the six interior panels of a carton or secondary carrying bag that is of unitary construction. The panels of the articles are produced from either a single web of cellulosic recyclable material that is folded, or two or more webs that are unrolled in parallel and connected at their periphery. In other words, the panels are not supplied as separate pieces to line the interior of the carton, whether they are unconnected or connected inside the carton.

Materials of Construction

The materials utilized to construct the walls (panels) of the liner are cellulose-based. For the purposes of this specification, the term cellulose-based in the context of the liner walls means paper or paper tissue material. Examples of such materials include cellulose-wadding and creped paper, also known as Custom Wrap™ wadding commercially available from Sealed Air Corp. or Versa-Pak™ cushioning products commercially distributed by NPS Corp. of Greenbay, Wis. Preferably, the materials of construction are multiple connected layers, preferably of kraft unbleached tissue. More preferably, the multi-layer materials of construction are creped or wrinkled. Multi-layer tissue can also be used in embossed or un-embossed form.

Preferably, the materials of construction of the walls or panels of the liners are recyclable, as defined below. More preferably, they are fully recyclable. Most preferably, they are perfectly recyclable. The term recyclable means greater that 50 wt % of the material is recyclable, based on the total weight of the liner. The term fully recyclable means that essentially all (i.e., greater than 90 wt %) is recyclable. The term perfectly recyclable means that 100 wt % of the material is recyclable. For the purposes of this specification, the term recyclable refers to the recycling process for cellulose-based materials such as paper, paper products or tissue. Thus, to be recyclable, the material must be paper, paper products or tissue, must be repulpable, i.e., water soluble in the repulping process, and can be biodegradable and compostable. Preferably, to be recyclable, the material should have fiber qualities meeting particular dimension requirements as described below.

Materials for the liner can be manufactured from the combining and connecting of multiple layers of cellulose-based tissue materials that are themselves manufactured in a tissue manufacturing process, using mechanical treatment that includes crimping, embossing, glueing, stamping and connecting. Preferably, a tissue paper manufacturing process is utilized that creates a wrinkling in the individual layers of tissue or any other method of creating voids or air pockets in between the layers. Tissue layers manufactured by either method can be later combined and attached to one another to provide insulative properties, so that while compared to non-wrinkled or flat tissue, the treated tissue provides superior insulation. Another method of improving the insulating value of the combined material is to subject unwrinkled finished dry tissue in web, work-in-process or finished article form, to a wrinkling process including re-moistening and heating or drying, chemical wrinkling, moistening and cooling, or the use of two or more of these processes. Preferably, the tissue paper is produced by combining tissue material that is creped while it is manufactured. Since tissue paper tends to demonstrate high liquid absorbency that can weaken or soil the article, articles manufactured using it can be improved by adding a layer of heavier weight, smoother texture paper material or other material with lower liquid absorbency. Such layers can be applied during the manufacturing of the multilayer tissue process, while such material is applied to one or both surfaces of the material. Materials with less absorbency can also be added during the conversion process of bags and connected to desired sides of the bag then.

Preferably, the liner described above is manufactured using cellulose materials such as kraft or unbleached natural colored tissue, or bleached tissue. Lighter colored papers including covering layers may provide reduced heat absorption properties in some applications and therefore provide superior protection against heat. The primarily paper construction when used in conjunction with water-soluble adhesives yields a liner that is largely recyclable where recyclers use a process that first creates a pulp material that is later turned into more paper materials. Less processed cellulose materials are preferred in that they consist of longer cellulose fibers that are more desirable to recycling facilities. For the purpose of this specification, the term less processed cellulose materials means cellulose material that has been through one or fewer recycling processes. Longer cellulose fibers provide greater strength to products manufactured using them, and are therefore more desirable for and graded higher by recyclers. Comparatively, products made using macerated newsprint which consists of shorter fiber cellulose material of lesser value when graded by recyclers and are possibly sent to landfills instead of being recycled. Preferably, to be recyclable, the average fiber length of the pulped fiber is 0.7 to 3.2 mm. More preferably, the average fiber length of the resultant pulped fibers produced in the recycling process is from 0.824 to 3.2 mm. When the pulped fiber is tissue material, the average fiber length of the pulped fiber is more preferably from 1.0 to 3.2 mm. When the pulped fiber is not tissue material the average fiber length is more preferably from 0.824 to 0.744 mm. To be recyclable, preferably, the average fiber width of the pulped non-tissue fibers are from 20.8 to 19.8 μm, and preferably, the fiber shape factor of the pulped non-tissue fibers is from 90.1 to 89.3. The average fiber length, average fiber width and fiber shape factor are as described in Recycling of the Hardwood Kraft Pulp, Geffertova et al, Technical University in Zvolen, Faculty of Wood Sciences and Technology, March 2012, www.intechopen.com, p 270-275.

Although cellulose tissue materials are natural insulators due to their constitutive fiber's low heat conductivity, multiple layers of tissue are preferred in that they provide multiple air pockets between such layers that further slow the transfer of heat through sheets or panels made of the same. In the preferred creped form, even more air pockets are contained that further retard heat flow resulting in enhanced insulation performance. Here, heat flow indicates flow from one side of a layer of the tissue or multiple layers to the other side, i.e. through a top layer to the other side bottom layer and out.

Insulation performance can be improved if a layer or multiple layers of metalized paper or tissue are connected to the multilayer tissue material. Such metalized materials must not render articles containing them non-recyclable. The metalized paper or tissue acts to reflect heat energy away as well as reduce vapor transmission, both of which can affect thermal performance. Also, any applied treatment of one or more layers or added layers of materials that reduce vapor transmission through the material can be added or applied to the multi-layer cellulose material in order to enhance its insulative properties. Preferably, such treatment does not render articles made of the same non recyclable.

Figure 2:
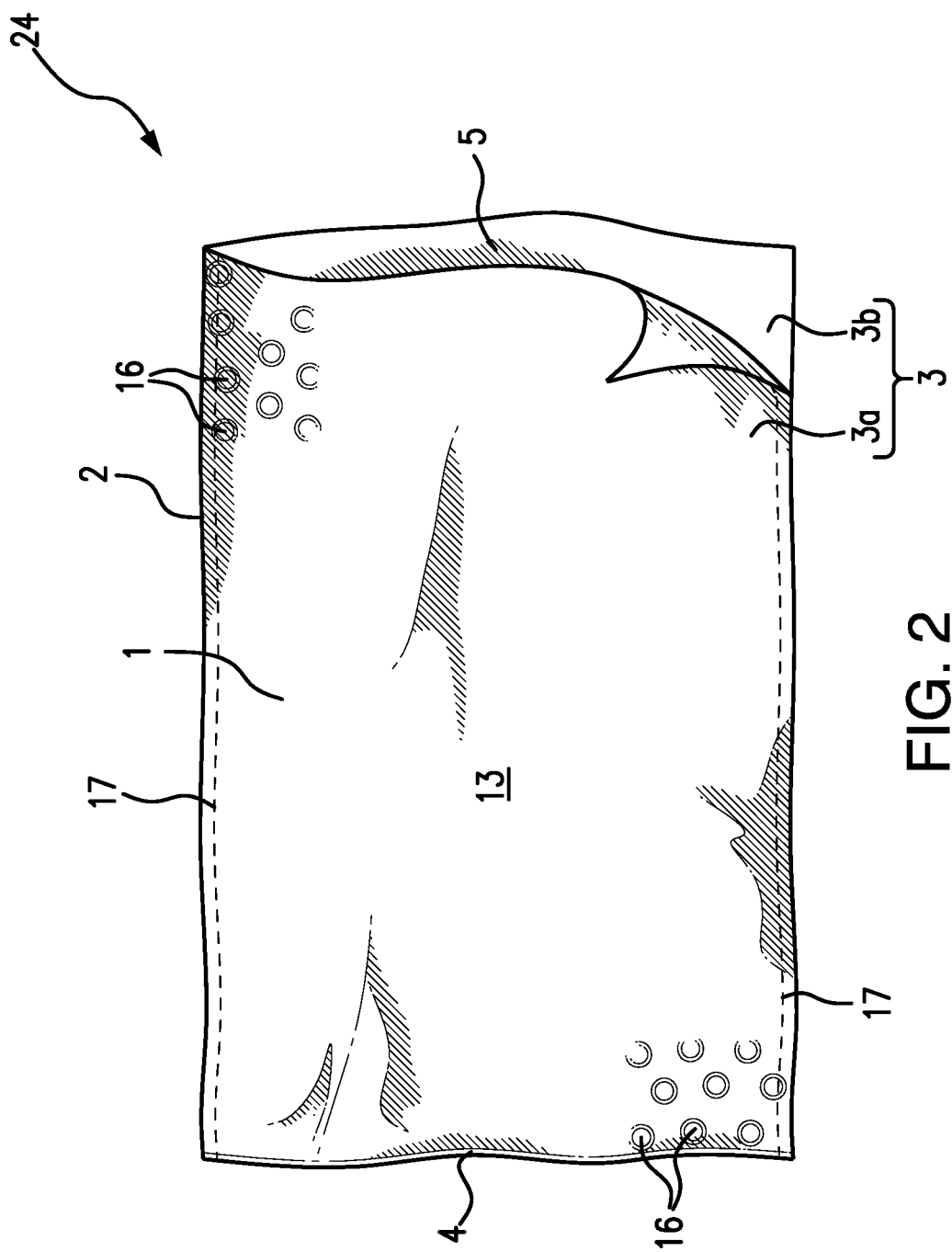
FIG. 2 shows a perspective view of a folded sheet of multilayer cellulose material with edges connected, and an unconnected open end.

Paper material such as 401*b* or lighter unbleached, when attached to the multi-layer cellulose tissue material on one or both sides, can allow the production of the aforementioned protective pouches such as those in FIG. 2, that can be converted into protective cushioning envelopes that can be used for shipping without the use of outer corrugated protective devices.

Additionally, attached paper material or treated tissue material on the inner and outer layers of the multi-layer cellulose material that is treated to present static dissipative, electrostatic discharge protective properties, electrically dissipative or to be conductive facilitates the production of a fully recyclable cushioned pouch that can be used to protect electrostatically sensitive electronic devices during transport and storage. Inner and outer layers of such paper or tissue can have a variety of these properties i.e. the outer layer can be conductive while the inner most that touches the electrically sensitive device can be dissipative.

Connecting Element

Figure 8:
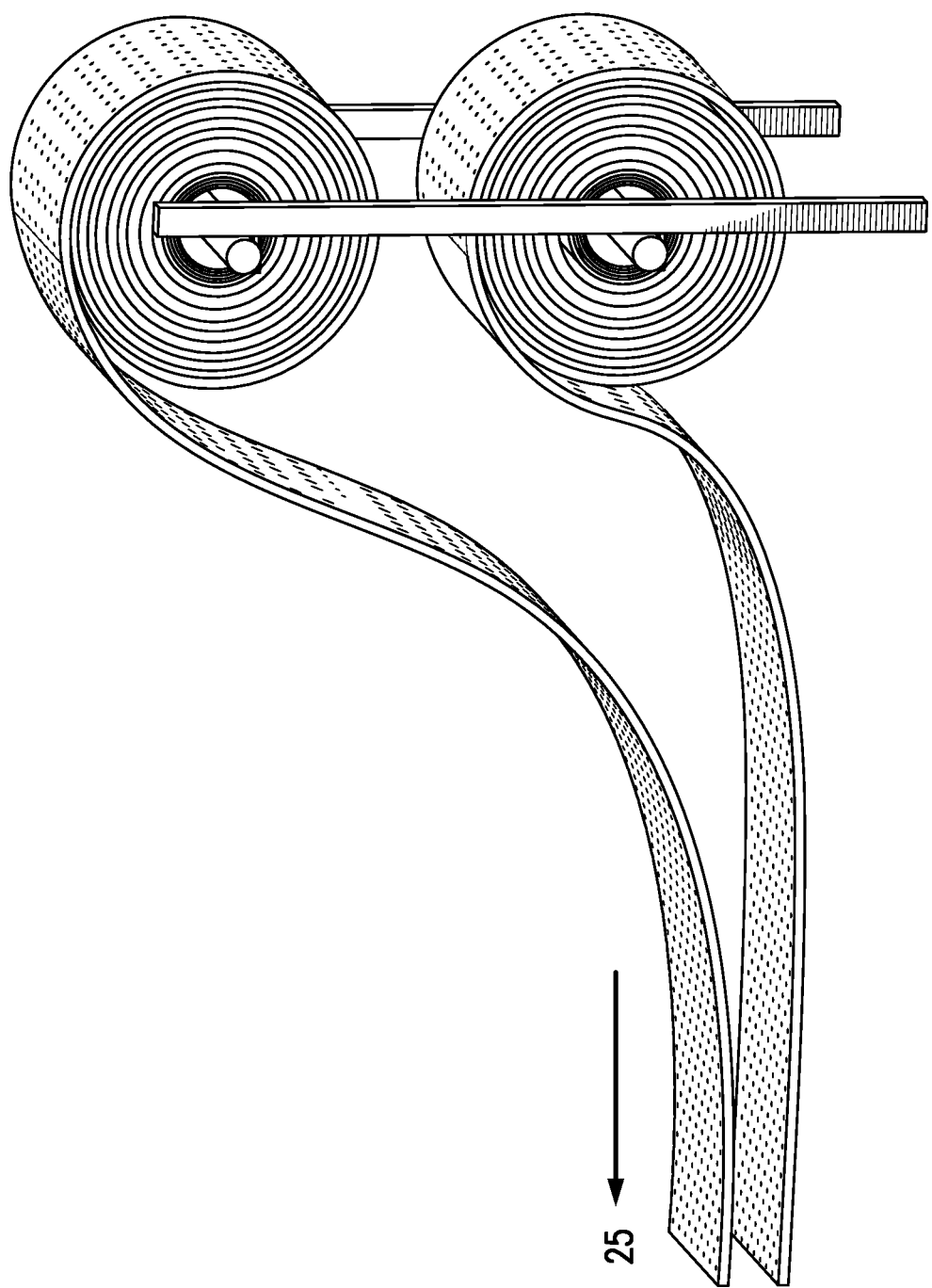
FIG. 8 shows a perspective view of two rolls of multilayer cellulose material being unwound into sheets.

The connecting elements used in the box liners of the present invention include water-soluble adhesives, starch-based adhesives and cellulose-based fastening devices or combinations thereof. The connecting elements can also be a sewed line. However, as discussed above, the connecting elements cannot be heat sealed with thermoplastic materials. Edge connecting materials such as paper-based tapes using water soluble pressure sensitive acrylic, water based or starch-based adhesives can be used. The adhesives can be applied directly to the panels of the liner, or indirectly as part of a tape, where the adhesive is on one side of a tape, and the adhesive is between the tape and the article edge. Water activated starch adhesives tape with a pre-applied adhesive, for example "Central 160 WAT Non Reinforced Gum Tape," is commercially available from Central. The connecting elements are used to join portions of the cellulosic material that are not folded together. This is illustrated, e.g., in FIG. 2, where the intra-panel connection line 17 on both sides of the panel 13 is the connecting element. When the liner is expanded to define a cubic or rectangular cuboid inner space bounded by the resultant four side panels and bottom panel of the liner, the intra-panel connection lines 17 are located on panels opposite one another running from the folded bottom of the liner to the unconnected top of the liner generally bisecting the side panel into the two sections corresponding to previously unconnected liner edges that were joined. The intra-panel connection line 17 can also be present on the bottom panel, when the cellulosic material is formed not by being folded over upon itself, but by being processed in parallel, as shown in FIG. 8.

Method of Conversion into a Carton Liner

In order to form a recyclable, box-shaped liner with space efficiency, while being recyclable, several methods can be used. In these methods discussed below, the terms "attaching," "sealing;" and "connecting;" and "attached," "sealed," and "connected" are used interchangeably to denote the joining of portions of the carton liner using a connecting element. The term "fully closed" means each of the openings of the article present as "connected" seams are reduced to surface to surface contact of no greater than 1.5 mm, preferably no greater than 1.0 mm, or said gaps in between surfaces are eliminated by the use of folded connections between the panels. Further, while all of the edge connecting methods described above can be performed using adhesive tape applied to the edges of the articles that need to be attached, unless otherwise stated, any connecting, attaching or sealing method above can be interchangeably used, including taping, gluing, sewing, crimping or other connecting methods. When taping is used, a preferred tape is a pulpable paper tape with a water soluble adhesive such as a starch based or acrylic adhesive. When edge banding is used, edge banding machinery used in the book binding industry can also be utilized. In a similar fashion, sewing or stitching using a water soluble fiber thread with or without an edge tape can be utilized; although, not all threads may be suitable. Non water soluble threads can also be suitable, again because these materials can be filtered out. Two layers of opposing tape on opposing sides, inner and outer portions of the edges to be joined can be used as well, instead of one layer that is folded around the edges that are to be joined. Paper strips used with separate cold or hot adhesive applicators can also be utilized for any closure or connecting method.

Figure 1:
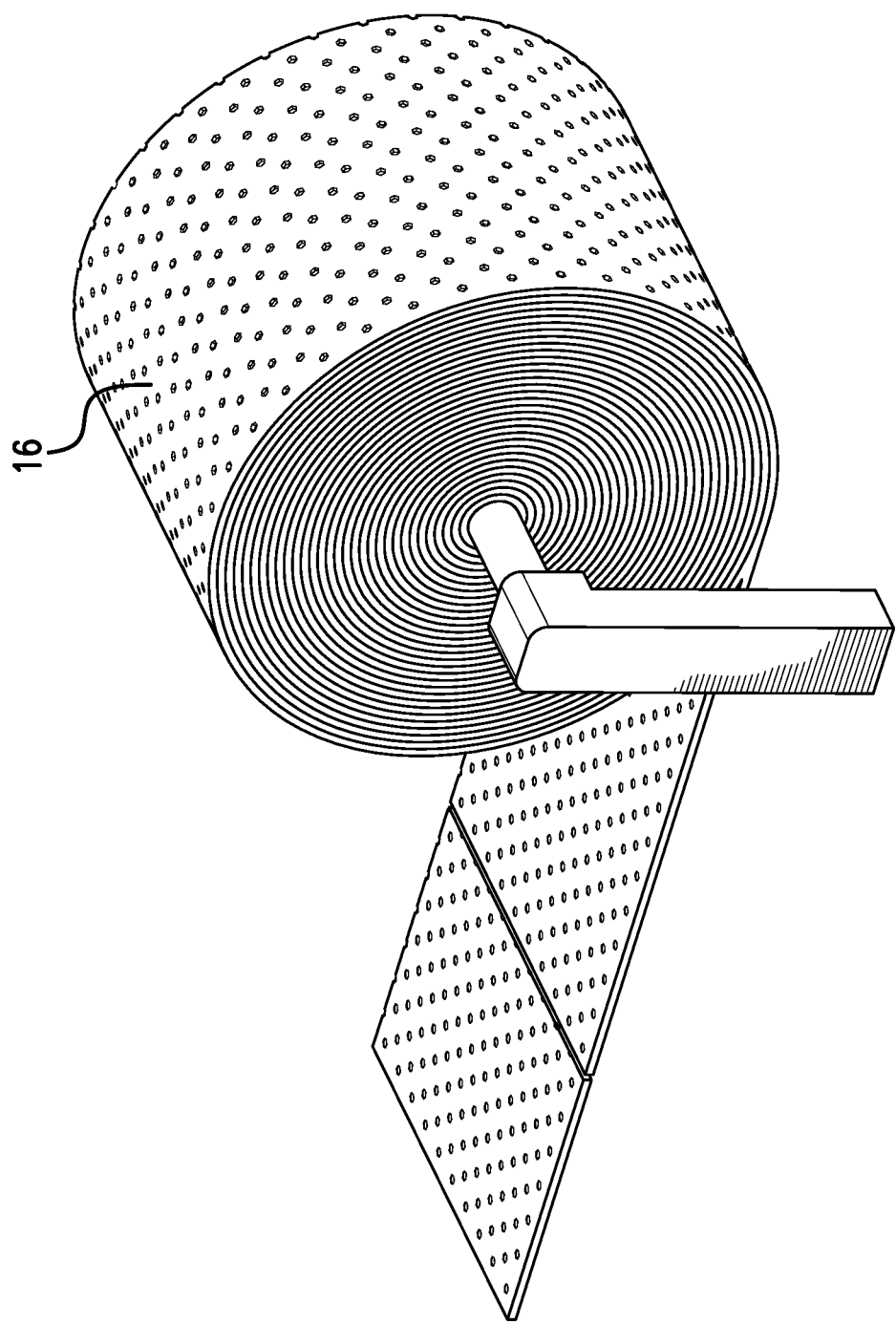
FIG. 1 shows a perspective view of a roll of multilayer cellulose material.

In a first method of preparing the liner, the proper sized sheets of multi-layer tissue material are unwound from a roll as in FIG. 1, folded to provide a pouch type article as in FIG. 2 with a folded bottom, open top and open sides. Then, in order to form the proper size square bottom, largely square shape portions are identified on the folded edge, in two corners as in FIG. 3, and then cut off as in FIG. 4. Here, the bottom corners and sides remain unconnected. Then, the side edges are first connected, e.g., using a multiple step process that includes application of the adhesive to one or both sides to be connected, compression and curing or drying time that occur before subsequent steps are performed. The compression also allows the adhesive to penetrate multiple layers of tissue that will create a more thermally insulating connection. As discussed above, the side edges can also be connected by sewing or taping.

In a first step, when adhesives are used to be the connecting element, the open sides of the pouch-like liner are glued at the sides and pressure is applied to enhance the gluing affect. Since the material is made of many layers, the glue must be allowed to penetrate multiple layers so that final bonding will include many layers on both sides of the bond, and therefore creates a stronger, more resilient attachment that is not superficial. It is key to the invention that seals are without significant gaps, as discussed above, that result in one or fewer layers of the cellulosic material serving as the barrier to the contents of the insulated article. Generally, unacceptable gaps in edge connecting are those that allow a full penetration of light or the absence of a physical connection of edges or otherwise effect the thermal protective performance of the article. After application of the glue, the article is placed in a holding area where at least 12 hours are provided for the adhesive that was applied to cure, creating a pouch with secure sides and two open corners. Pressure can be applied during the curing process to enhance the bond. This complete curing step is essential to create a secure partially formed liner that can be manipulated to further provide a square bottom liner in a process that will place opening force on the bonds made in creating a pouch.

Once the two sides are securely glued to one another, a similar step is performed by opening the pouch and bringing together the opposite edges of the bottom corners together, as in FIG. 5, while affixing them to one another using the same adhesive. This step is repeated on the opposite open corner.

A similar hold time is used to allow the bond to cure, while holding together the edges to be attached, and repositioning the remaining material on the pouch to allow such alignment.

Figure 6:
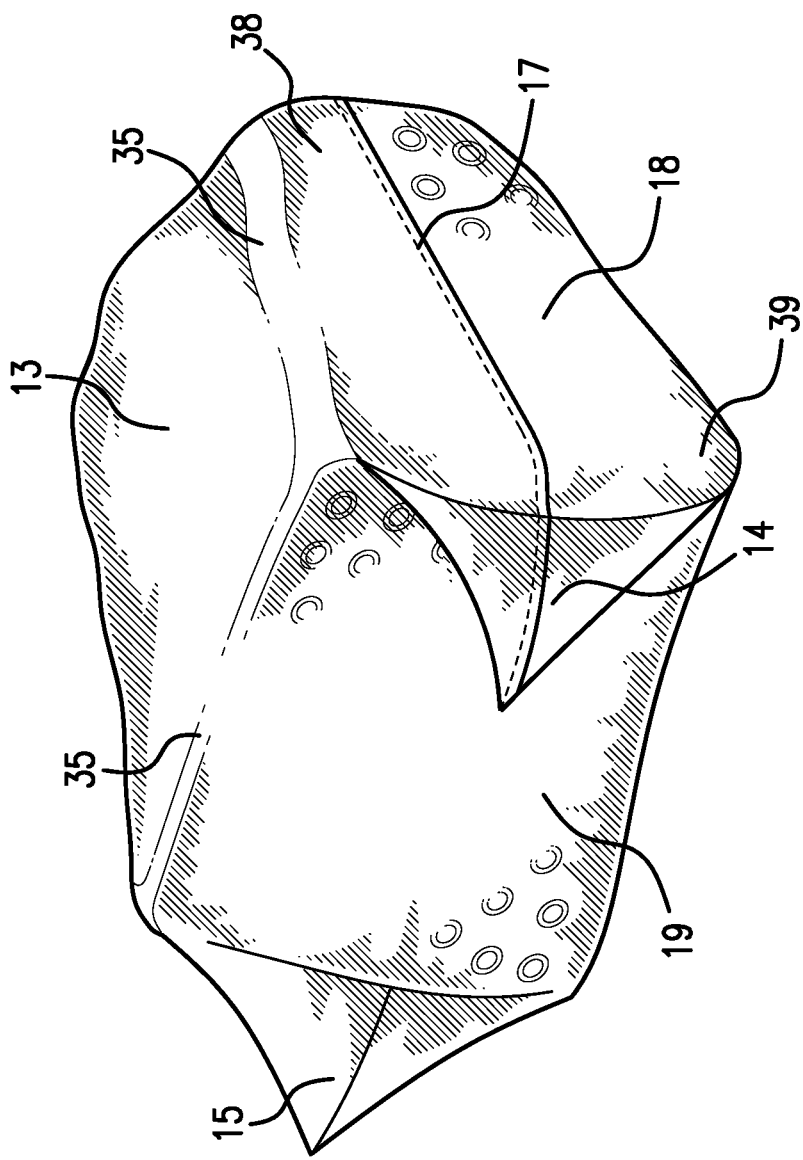
FIG. 6 shows a perspective view of a folded sheet of the multilayer cellulose material as in FIG. 2 that is manipulated to form two bottom triangular points at the corners by expanding the pouch in FIG. 2 and pulling out the bottom corners.

In a similar process, after the pouch-forming step is performed creating the pouch in FIG. 2, the edge connecting method is performed on both open side edges, and the end corners of the pouch can be folded into triangular pouches as shown in FIG. 6. The base of such triangles are manipulated to yield an edge that will be the length of one of the edges of the box to be lined. The triangle is then cut off as in FIG. 7, and the open edges are then glued together at the edges that were formerly the base of the triangular pouch, creating two bottom edges which along with the two perpendicular existing edges create the bottom of a cube shaped bag. Such a process can be achieved using an automated method that performs one or all of these steps.

Figure 7:
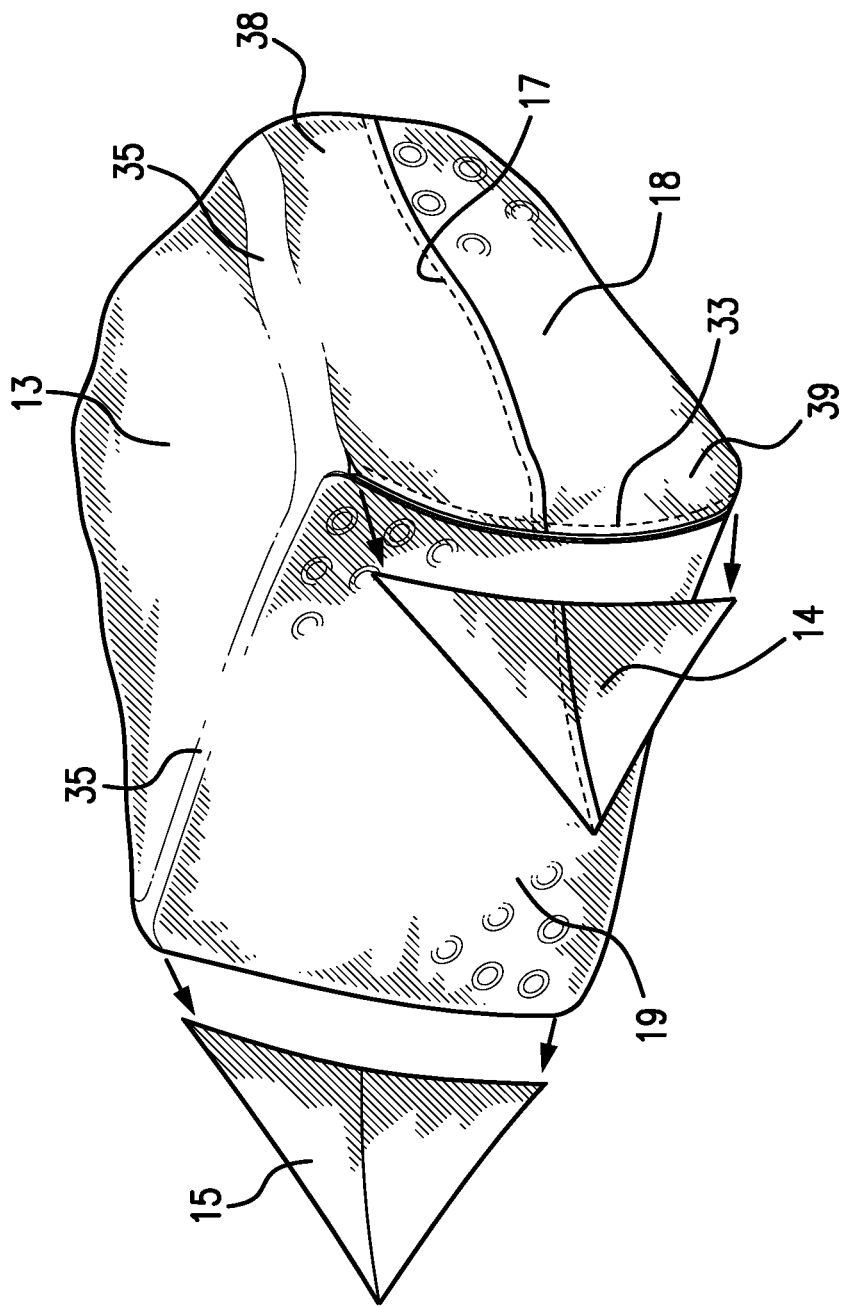
FIG. 7 shows a perspective view of a folded sheet of the multilayer cellulose material as in FIG. 6 where a bottom edge is created by removing the triangular portions at their base and connecting the resultant bottom edges of a bag.
Figure 7B:
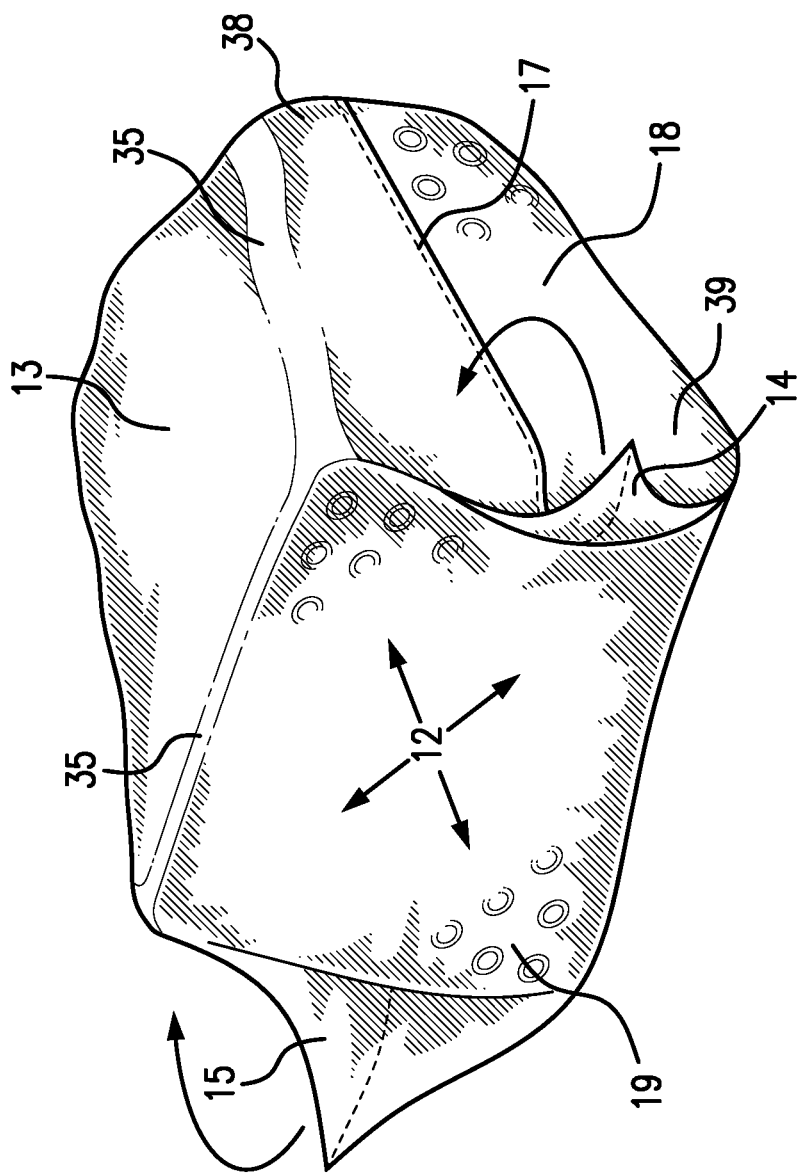
FIG. 7B shows a perspective view of a folded sheet of the multilayer cellulose material as in FIG. 6 where a bottom edge is created by alternatively folding up the bottom corners, thereby creating bottom edges of a bag.
Figure 7C:
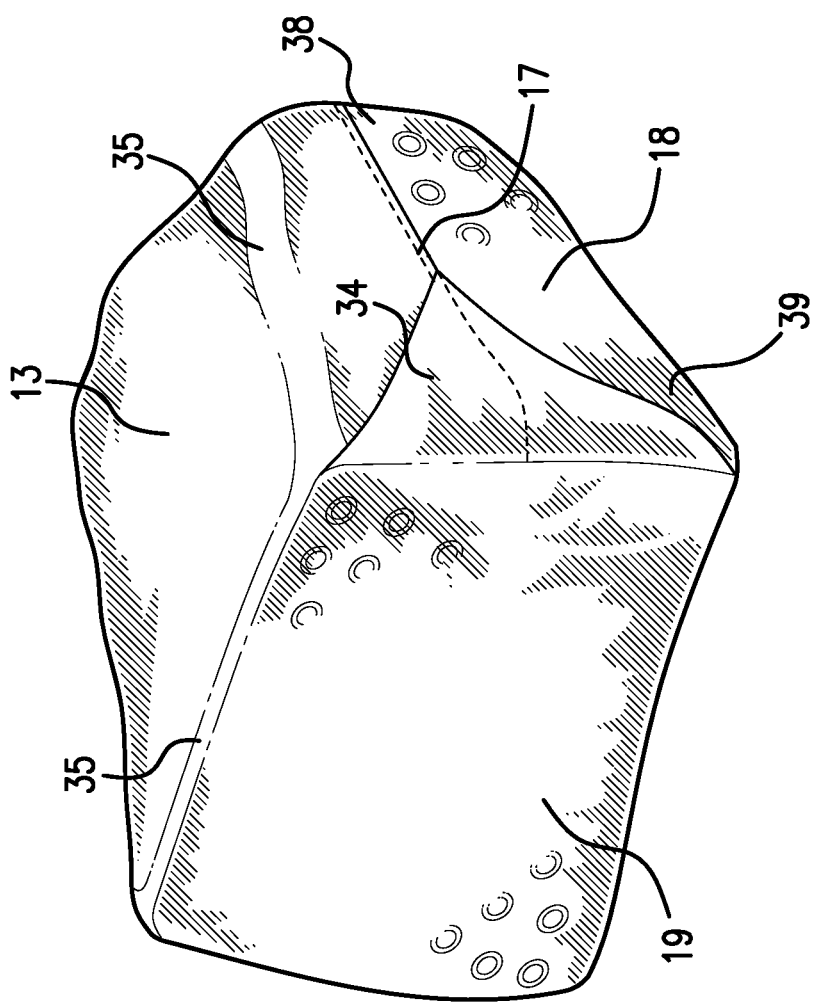
FIG. 7C shows a perspective view of a folded sheet of multilayer cellulose material as in FIG. 7B where the bottom corners that are folded are contacted to the side wall of the newly formed bag.

In a similar method, in order to fashion a squaring of the ends that will properly fit the inside of a carton, the pouch in FIG. 6 is considered, where instead of cutting off the formed triangle pouches, the pouches are lifted up and attached to the side panel above and affixed to that panel using paper-based tape, as shown in FIG. 7B. This step is repeated at the opposite end, resulting in straight edges that will be positioned generally, at 90 degrees from the adjacent resulting edges. When completed, this process results in a liner with 4 straight bottom edges compatible in fit to the desired carton dimensions, as shown in FIG. 7C. The taped bottom edges of articles tend to provide a beneficial identifiers of the proper positioning of the article inside a carton and provide favorable rigidity that enhances the fitting inside the same.

For storage, completed articles can be collapsed by a tucking in and folding of the square bottom panel, side panels, end panels or any combination of one or more of these panels, allowing the collapse and folding of the bag. This provides very helpful size reduction advantages that greatly increase transport and storage efficiencies. Finished articles can be collapsed to save space. Individual or lot quantities of articles can be compressed and maintained in compressed form for storage and transportation. Such storage can include mechanical devices such as plastic outer bags, twine or other rope like device or vacuum plastic materials.

In a more automated method, two rolls of multi-layer tissue material are unwound to fashion a two layer web of the same as in FIG. 8. The layers are introduced into a gluing and cutting device that cuts rectangular shapes in line with each other, and spaced apart at regular intervals as shown in FIG. 9. This process is performed while the edges are glued together, as in FIG. 11. If thicker layers of multi-layer cellulosic materials are desired, say to achieve higher protective value, any connecting method mentioned can be utilized to achieve a thicker material by connecting two or more layers together resulting in a material that is later used in a bag manufacturing process.

Later, such a liner is segmented by bisecting the cut out rectangular shapes and transversally cutting the two-layer web entirely, yielding a two layer section article with a largely linear top and two cut-outs at bottom corners, as in FIG. 9.

Figure 11:
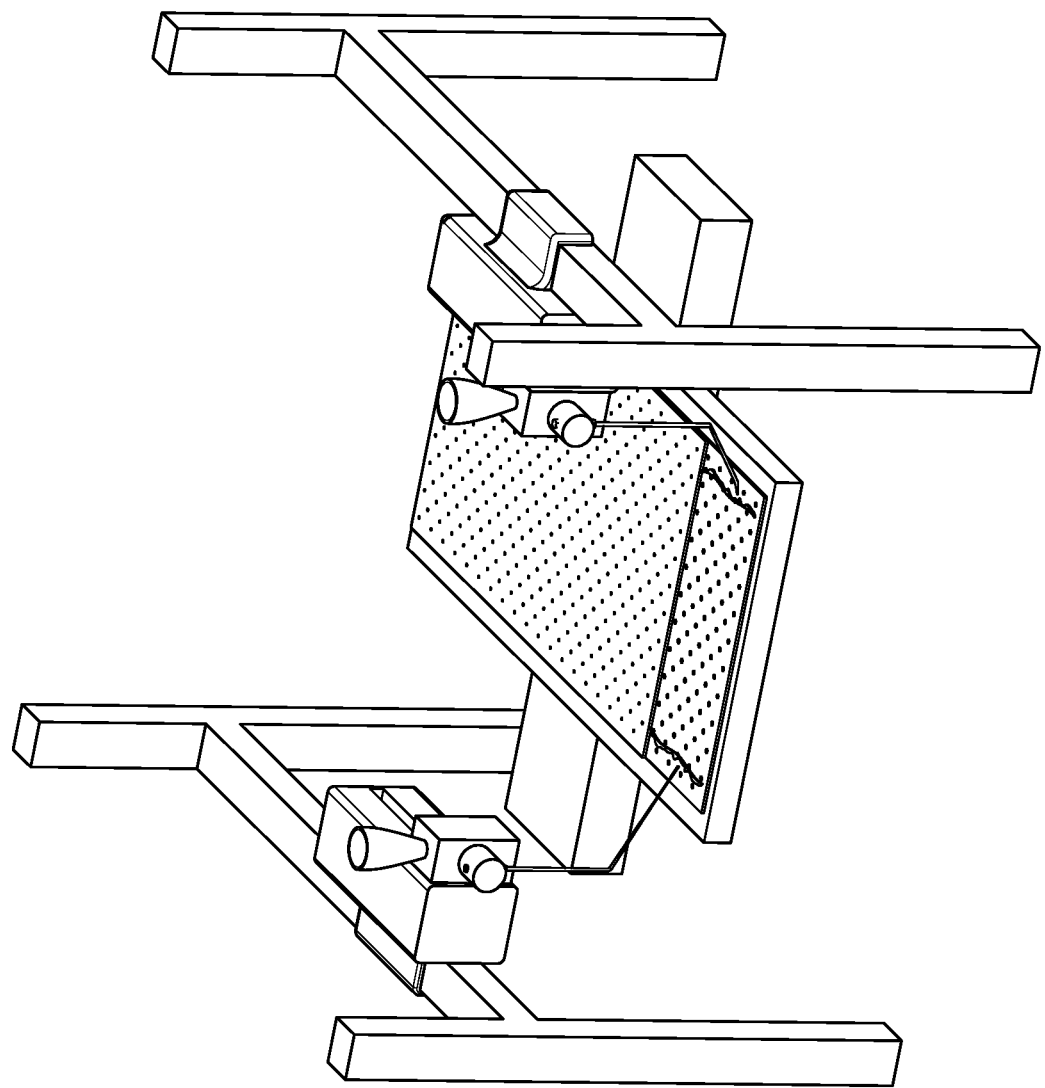
FIG. 11 shows a close up of the edge connecting method in FIGS. 9 and 10.

The open side edges and bottom corners can be affixed to one another utilizing adhesives that are applied in preferably two stages; with a first stage that is applied to unconnected remaining edges that are perpendicular to the connected edges as in FIG. 11, albeit in a device that must lift and apply adhesive to a pouch like article. A second stage is performed as a tertiary process, as in FIG. 5, applied to the two bottom corners by opening the now formed pouch and adjoining the opposite edges of the opened corner and affixing said edges using adhesive.

The method above can be performed with a waiting period in three stages when using cold glues that require curing time, or those that require more than thirty minutes or up to a day of cure time; or with hot glues or adhesive tapes that require much less and thus no holding period.

Additionally, a similar method can be used with a single web of multi-layer tissue that is folded and subjected to cutting and segmentation steps wherein the in-line cut-outs are on the folded edge. Such a method will require connecting the two sides and bottom corners as in the previous method but does not require bottom edge connecting, since the bottom is a fold of the material.

In FIG. 10 a similar method is shown where the same two separate webs of multi-layer material can alternatively be cut at opposite edges and later segmented by performing the first cut outs, and transversally cut at an appropriate location across the web that results in a proper size square or rectangular article with open edges and cut outs at two opposite corners.

Such a segmented liner is then subjected to a connecting step to close the bottom edge of a formed pouch and subsequently at bottom open corners in similar fashion to the prior method as shown in FIG. 5A.

The edge connecting methods above can be facilitated by applying the necessary adhesives for the edges and bottoms, while the materials are in web format, and preferably before the two webs are in contact.

Also, two-layer webs of the insulating cellulosic material can be glued together and can be stored for later segmentation with or without the cut outs described.

Preferably, the form of cutting the multilayer cellulosic material is shear cutting.

The preceding automated methods of creating a segmented pouch with open corners can be performed by creating a two-layer tube of material by connecting, preferably via taping, sewing, or gluing one or two webs of the said material. Similar subsequent steps can be performed such as cutting out bottom portions and sealing bottom edges to produce an open top insulated liner. An alternative method of creating a liner for a six-sided carton is also described wherein multiple unconnected panels of said multilayer insulation material are affixed at the edges and ends in order to create the same square bottom open top receptacle insulated. Indeed, the pouch design described in the present specification and the numerous methods and options for assembling it demonstrate its unique versatility and utility.

As discussed above, all of the edge connecting methods described above are performed using adhesive tape applied to the edges of the articles that need to be attached, however, connecting or sealing method such as taping, gluing or sewing can be used. However, when taping is used, a preferred tape is a pulpable paper tape with a water soluble adhesive such as a starch based or acrylic adhesive. Edge banding machinery used in the book binding industry can be utilized while employing paper banding. In a similar fashion, sewing or stitching using a water soluble fiber thread with or without an edge tape can be utilized although any thread is suitable. Two layers of opposing tape on opposing sides, inner and outer portions of the edges to be joined can be used as well, instead of one layer that is folded around the edges that are to be joined. Paper strips used with separate cold or hot adhesive applicators can also be utilized for any closure or connecting method. The term banding or binding are interchangeable for the purposes of this specification.

When tape is utilized to connect edges, it's important to ensure there are no gaps of the insulating material in the joint created in performing such steps. In an embodiment of this invention, a unique method of tape application is utilized to ensure the two edges being connected are abutted firmly. For example, when the edges to be connected are stacked as in FIG. 12, when connecting the edges of the pouch formed by folding a layer of material such as that in FIG. 2; the taped connection will be a wrapping of the edge such as that in FIG. 13.

In the configuration described above, a flattening of the edge connected in a first stacked form can be performed by opening the pouch to a position where connected layers are in a linear fashion, with the connection in between. Such a position can be achieved, e.g., when the bag is opened to be filled with contents and as such can create a gap in the edges of material that will result in a diminished insulation performance of the article.

Figure 13:
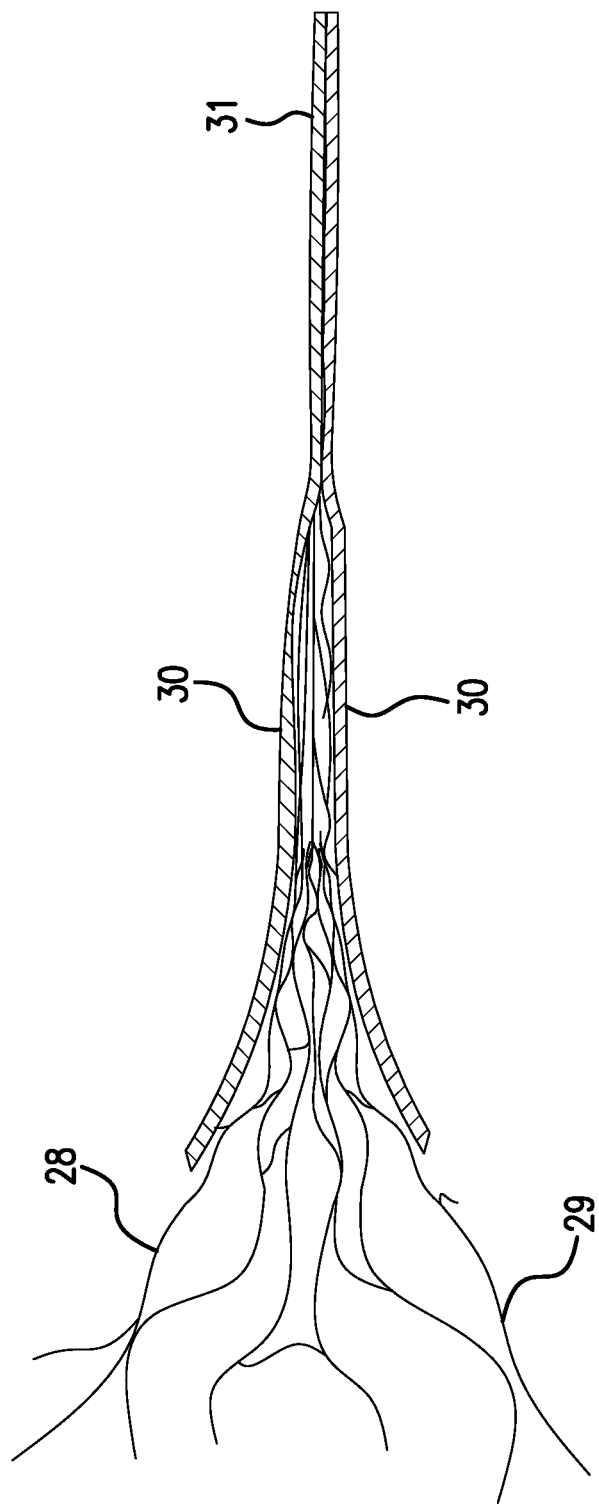
FIG. 13 shows the two edges of FIG. 12 after a connecting method is applied.

Preferably, a superior method of applying a tape closure is described here when a single piece of tape is utilized, a tab of tape material free of the cellulosic insulating material is formed adjacent the edges being connected. Such a tab is shown in FIG. 13, which provides a clamping or pinching effect on the edge being connected; so that when edges connected in stacked form are flattened, such as demonstrated by the positioning of the connected panels in FIG. 5, there is little to no gap in insulating cellulosic material. The tape tabs, due to their bonding at the very edge of the abutment of the edges of cellulosic material, also create a forceful pulling of the edges together when the tab is created as well as a lasting bond that remains when the edges are flattened. The tab creating method can be performed using one or more strips of tape in a manual or automated processes. When one strip is used, first the edges of tape are applied while the tape envelopes the stacked edge and pressure is applied to affix the tape to a sufficient portion of the cellulosic materials while leaving excess tape material free of cellulosic material adjacent the edge being connected to allow the creation of a tab. In a subsequent or concurrent step, the excess material is sufficiently compressed so that the adhesive surfaces connect to one another creating the necessary tab 31. The loftiness of the preferred multilayer tissue material makes this method preferred since the thicker materials with more memory require more forceful edge connecting methods to reduce the loft, as provided by the tab method described.

A similar method can be used where two strips of tape are applied to the bottom and top layers of stacked edges, while leaving excess tape material adjacent the edge to be connected, wherein the excess material can be compressed and adhered to one another while providing the desired tab that provides the pinching effect to the edges of cellulosic material.

The insulation value at the seals can be enhanced by an overlapping of the edges prior to connecting, using any mentioned tape or other method. This can be achieved with an offsetting of the edges when stacked or overlapping of the edges when laid flat.

An alternative form of connecting the edges of multi-layer tissue is crimping using mechanical force to interlock the layers. Also, a locking effect can be achieved by cutting strips or fingers of the material on both layers of a stacked edge then pushing the fingers to opposite sides to lock the respective section together; similar to a weaving.

The top of the finished article can be closed after the contents have been placed inside. Since the multilayer tissue material may in some applications be too delicate for application of traditional peel and seal tape devices, alternative closure methods may be necessary. In the semi-automated pouch forming processes above, such as in FIG. 9, as the roll of sheet form material is unwound, or after the process above manipulating the pouch above is performed, a cellulosic adhesive tape type material of adequate width to join and hold closed the top edge of the finished article, is applied to the top edge or edges that will serve as the closure device at the top of the finished liner. A similar but manual tape application process can be used to apply such a closure method when the top edge of the finished liner is not parallel to the direction of the unwinding of the roll of materials such as in FIG. 10. For the purpose of this specification, the term cellulosic in the context of adhesive tape means a strip of paper made primarily of cellulose fiber material with a water soluble adhesive that is pre-applied during production of the tape or thereafter. Any adhesive can be utilized on the cellulose tape but is preferably water soluble, such as a starch-based water activated adhesive; preferably, the adhesive is a proper acrylic type adhesive. For the purpose of this specification, the term pulpable in the context of the tape means that it yields paper pulp or it does not interfere with a paper recycling process Preferably, the tape applied to one or both top edges has two adhesive attachment methods, one for application onto the edge of the article in the manufacturing process and one for the user of the article to peel off and affix when connecting the article shut after filling with contents. More preferably, the paper tape presents a pure water soluble pressure sensitive adhesive with a removable liner that when removed, exposes the adhesive still adhered to the layer it was applied to and allowing the joining and attachment to the same that has been applied to facilitate adjoining of the edges to the opposite edge of the bag. The tape device on the opposite edge can be with or without adhesive and also extends above the top edge of the bag. Any of such steps can be performed in manual one-article-at-a-time method or inline such as in FIGS. 9 and 10.

A variation of this application of the use of taped top edges as a closure method of the article can also be a type of the mentioned edge banding method that helps with preventing fraying where the edges are enveloped with adhesive tape. Any of the mentioned connecting methods can be used to prevent fraying, whether applied when connecting layers of multi-layer cellulose based material or as an edge treatment. When sewing is used, 'over-edge' sewing can help prevent fraying when used for that purpose only and when used for connecting edges. One or both such enveloped edges can be then affixed with an adhesive device, like peel and seal tape, on one or both outer surfaces of the tape so as to facilitate closure of the top of the article by an adjoining of the banded edges of the article.

In another method, a strip of adhesive transfer tape is applied to the top edge of the web where a future top edge of the cellulosic material bag will be. Such a transfer tape will be applied with a peel off liner that will remain affixed to the adhesive and liner until it is used. When ready for use, the user simply peels off the liner to expose the adhesive, brings together the opposite top edges of the liner, a pressing step is performed then the liner top is connected and the contents are better protected. To facilitate the opening of the article by the recipient an easily removable or disconnecting top portion can be provided. A possible method is a perforation or other method to allow an 'easy tear' top portion of bag that will result in an opening of the bag.

In describing the edge connecting methods again, when a proper 'hot-melt' adhesive such as a protein containing, conventional hot melt and/or pulpable adhesives is utilized instead of a cold glue described in the processes above for joining edges, the wait time is significantly shorter, although similar steps must be followed to allow sequential step manufacture described above. An example of an hot melt glue is NP2068, a repulpable hot melt adhesive from HB Fuller of St. Paul Minn. Another hot melt adhesive example is H318-BG by Heartland Adhesives of Germantown, Wis. Since the multi-layer tissue material can fray or detach from one another, a tape or adhesive can be applied to the top unconnected edges of the article to secure the layers. Such an edge treatment can be applied in-line while unwinding the web of insulating tissue material or manually on each article. Any edge on the article can receive such an edge treatment. Preferably, the application fully envelopes the covered edge similar to FIG. 13, although a tab is unnecessary to prevent the fraying. When completed, a liner utilizing any of the above methods is inserted into a shipping carton, the heat or cold sensitive contents can then be placed inside the liner. Due to the fact that cold goods and/or refrigerant products tend to collect moisture, it is beneficial for the inside of the liner to have a treatment that prevents the moisture to enter the multiple layers of tissue thus reducing the insulation value.

An alternative method of protecting the inside of the liner from moisture can include the pre-treatment of a layer of tissue or paper with a water repelling treatment that reduces the absorption of liquids by the first or subsequent layers of tissue. Preferably, the water repellent materials used are food safe for compatibility with edible goods that may be packed in the protective article. Examples of such water repellent materials are silicone treatments. Chemical treatment of the tissue materials that provide a water repellant effect but do not render such tissue non-repulpable are preferred. For the purposes of this specification, the term non-repulpable in the context of the tissue materials means interfering with the paper recycling process due to the solubility characteristics. Specifically, components that are not water soluble cannot be re-pulped, may reduce the recycling value of the article and may interfere with the recycling process. Preferably, only the layer of tissue that is on the interior of the article touching the protected goods, is water repellant. An alternative water repellant feature is an absorbent device such as a removable absorbent pad that is applied to the bottom of said liner. Such a device will absorb water that collects over time due to condensation that is naturally more likely to collect at the bottom of the liner. Examples are extra tissue and superabsorbent materials such as the same cellulosic material. Paper materials that are heavier and less absorbent than tissue materials also provide helpful protection against moisture inside the article. Such materials, in treated and untreated form and placed on the outside layers of the article can present advantages in wet weather protection when such articles are used for delivery of goods or can be helpful in the conversion process by facilitating connection of panels.

Cellulose-Based Fastening Devices

After loading of the liner is complete, it must be closed at the top with a suggested cellulose-based closure device to fully enclose the goods. For the purposes of this specification, the term cellulose-based closure device means a paper-based tape with water soluble adhesive applied to it. Preferably, the closure device is a starch-based adhesive kraft tape or 'gum tape' that may require moistening to activate the adhesive material. More preferably, a water soluble pressure sensitive adhesive is used requiring no moistening. For the purposes of this specification, the term repulpable in the context of a pressure sensitive adhesive means wholly recyclable in a paper recycling process except for adhesive portions.

Preferably, the open top of the liner is closed by overlapping or joining of the edges protruding above the carton and securing them with the adhesive tape. When both opposite edges of the article present a tape on the edge, the two faces of the tape can be affixed to one another.

Since the liner may be designed so that the edges protrude above the top edges of the container, in order to be sufficiently tall that the edges join, after closure the joined material above the edge of the carton must be either folded, pushed down or rolled so they would fit inside the carton so that it can properly close. The closure of the article can alternatively be achieved by cutting the corners of the article in the portion extending above the carton, thereby creating four flaps that can be laid down over the top of the contents similar to the flaps of a carton.

Tear strips, visual identifiers or perforations can be applied to any closure method for the top to facilitate the opening of the bag by the recipient provided they do not destroy the recyclability.

Figure 3:
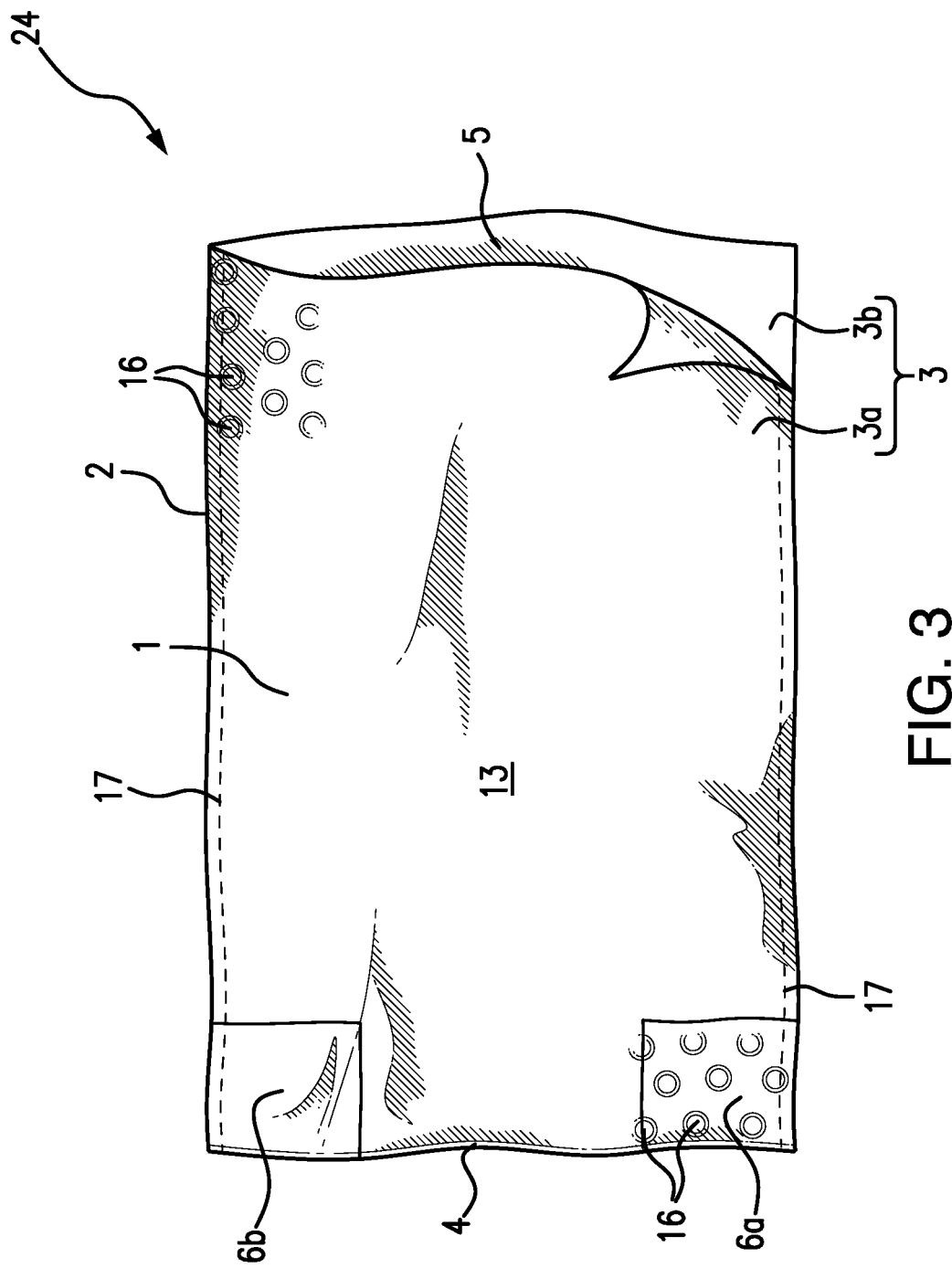
FIG. 3 shows a perspective view of a folded sheet of the multilayer cellulose material as in FIG. 2 with portions marked for cutting.
Figure 4:
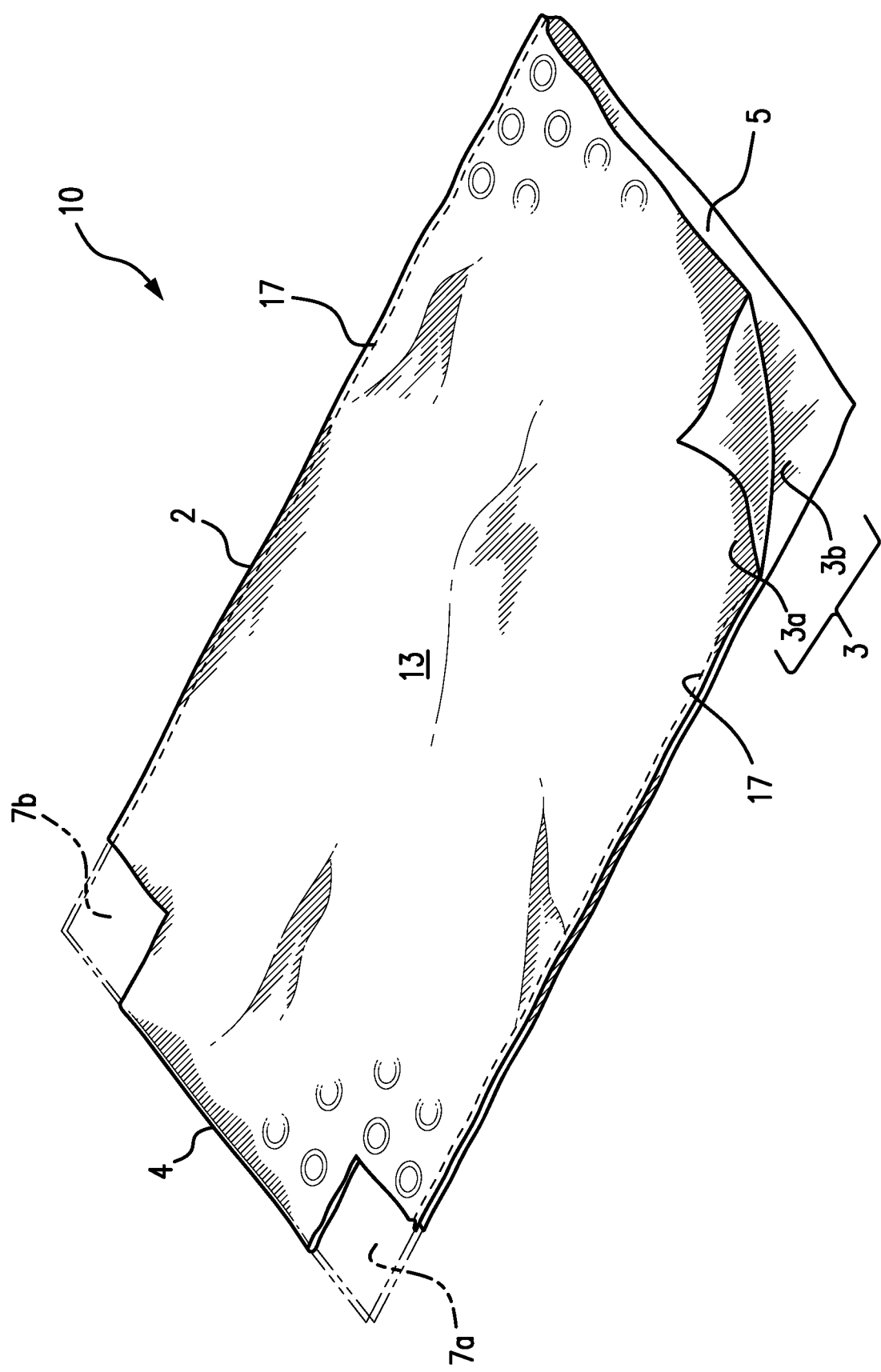
FIG. 4 shows a perspective view of a folded sheet of the multilayer cellulose material as in FIG. 2 with the corner marked corner portions now removed.

An additional design of the article can be described wherein one side wall extends above the opposite sidewall creating a lid type portion of the article such as in FIG. 14. The edge of such a lid or the opposite edge can be fashioned with adhesive device for affixing to the opposite edge. The former design can be helpful when the article is filled with a variety of amounts of goods in that the top edge of the taller sidewall can be variable connected to the edge of the lower side wall while reducing the amount of air space above the contents of the article. Referring now to FIG. 1, it shows a perspective view of a roll of multilayer cellulose material having stampings or embossing 16. Referring now to FIG. 2, it shows a perspective view of a folded sheet of multilayer cellulose material 1 (web) having stampings 16 with front side/panel 13, a first side edge 2, second side edge 3, composed of top second edge 3a and bottom second edge 3b connected by an intra-panel connection line 17, unconnected open top edge 5, and folded bottom edge 4, all together forming a connected pouch 24. Both side edges are connected at intra-panel connection lines 17. Referring now to FIG. 3, it shows a perspective view of a folded (unexpanded) sheet of multilayer cellulose material 1 as in FIG. 2 with corners marked for cutting. The diagonal dimension of the marked square corresponds to the length of the desired side edge being created. It includes a folded web of cellulosic material 1, front panel/side 13, first side edge 2, second side edge 3, which includes top second edge 3a and bottom second edge 3b, bottom folded edge 4, open top edge 5, and first bottom corner portion 6a and second bottom corner portion 6b. Referring now to FIG. 4, it shows a perspective view of a cut folded sheet of multilayer cellulose material forming a cut pouch 10, e.g., produced as in FIG. 2 with the corner portions removed in flat form, ready for opening and a subsequent abutting step of the resulting edges. It includes a first side edge 2, second side edge 3, including top second edge 3a and bottom second edge 3b, bottom folded edge 4, intra-panel connection lines 17, open (non-connected) top edge 5 and unconnected cut out corner sections 7a and 7b.

In FIGS. 2, 3, and 4, the bottom edge may alternately be attached rather than folded. This is achieved in a dual roll process as shown in FIG. 8 where the parallel sheets are cut and attached, e.g., through the use of adhesives, taping or sewing. Further processing of the resultant liner, with the bottom attached rather than being folded, proceeds as otherwise described in this specification.

Referring now to FIG. 5A it shows a perspective view of an expanded pouch 9, i.e., a folded sheet of multilayer cellulose material as in FIG. 2 with the corner portions removed, that has been expanded in order to join the resulting unconnected bottom edge with the resulting bottom edge on the side panel in order to form a connected bottom edge of the bag. The free edges of unconnected bottom corner section 11 are connected using a variety of methods described above. The step is repeated at the other side of the article to complete the fashioning of the second straight edge for a total of four straight edge on the article. It includes an expanded square bottom panel 19, free edges of unconnected bottom corner section 11, side panel 18 with intra-panel connection line 17, side panel upper portion 38, side panel bottom portion 39, open top edge 5 and folded panel connection lines 35. Typically, the side panel upper portion 38 means that portion of the side panel from the midline of the side panel, equidistant from bottom and top, to the top. Preferably, it means that portion of the side panel from the top (unconnected) edge of the liner to a point 25% of the total distance from the top to the midline, closer to the midline. Typically, the side panel lower portion 39 means that portion of the side panel from the midline of the side panel equidistant from bottom and top, to the bottom. Preferably, it means that portion of the side panel from the bottom of the liner to a point 25% of the total distance from the bottom to the midline, closer to the midline. Intra-panel connection line 17 runs from the side panel lower portion 39 to the side panel upper portion 38 and connects one section of the side panel to the other section, i.e., the left section to the right section. A corresponding intra-panel connection line 17 (not shown) exists on the opposite side panel. Referring now to FIG. 5B, it illustrates the expanded pouch of FIG. 5 where the free edges 11 have been connected to form bottom panel connection 33.

Figure 12:
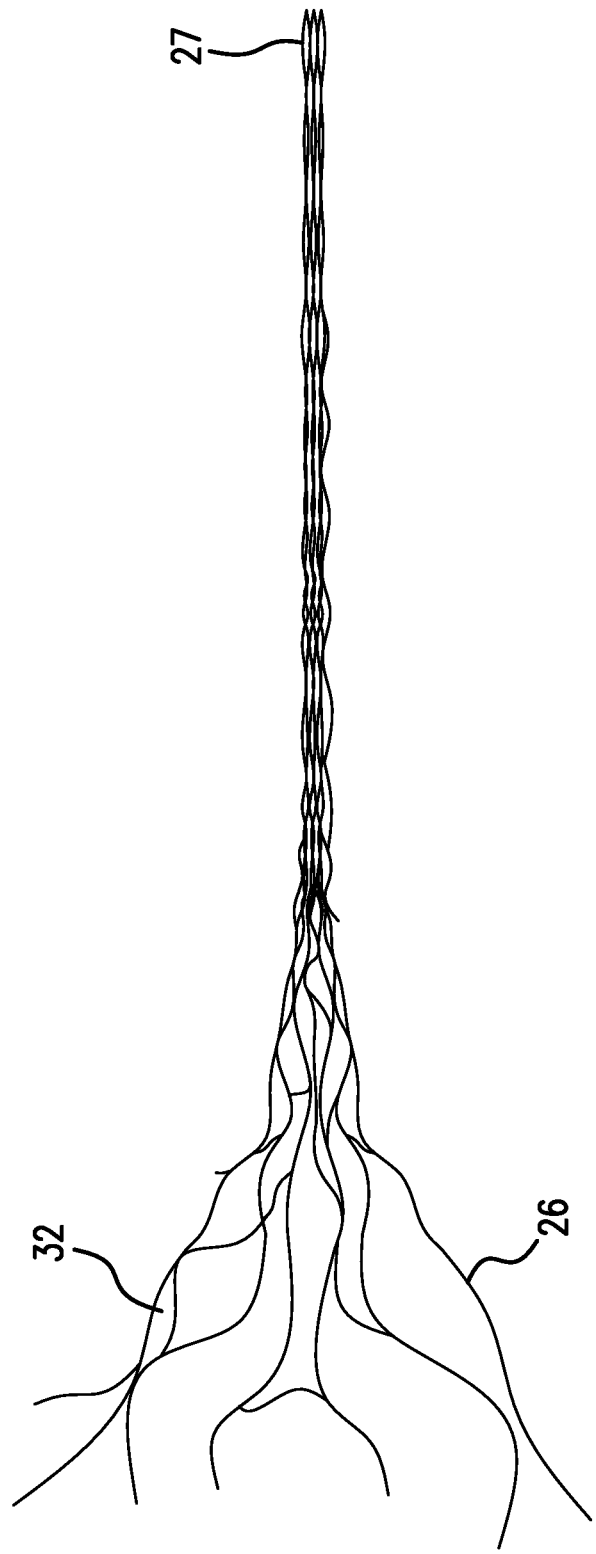
FIG. 12 shows a cross section of two edges of the multilayer cellulose material, stacked on top of one another.
Figure 14A:
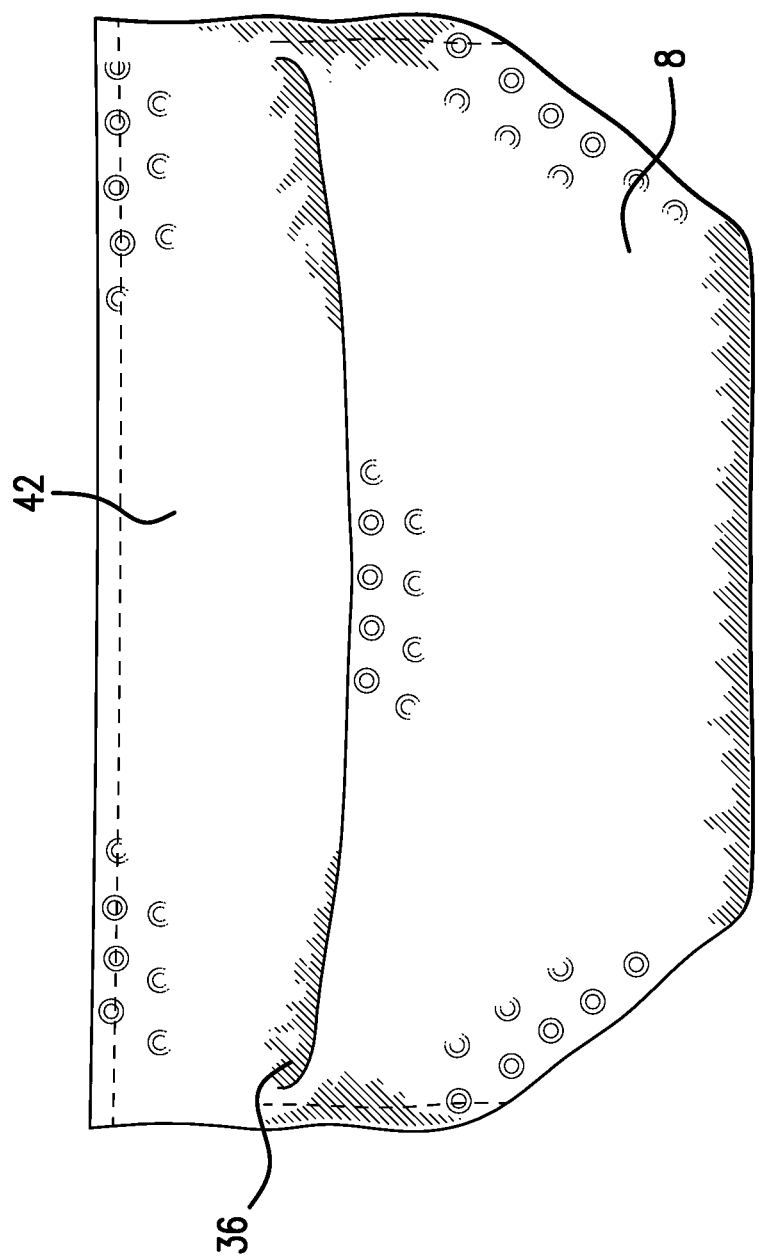
FIG. 14A shows an extended lip completed box liner.
Figure 14B:
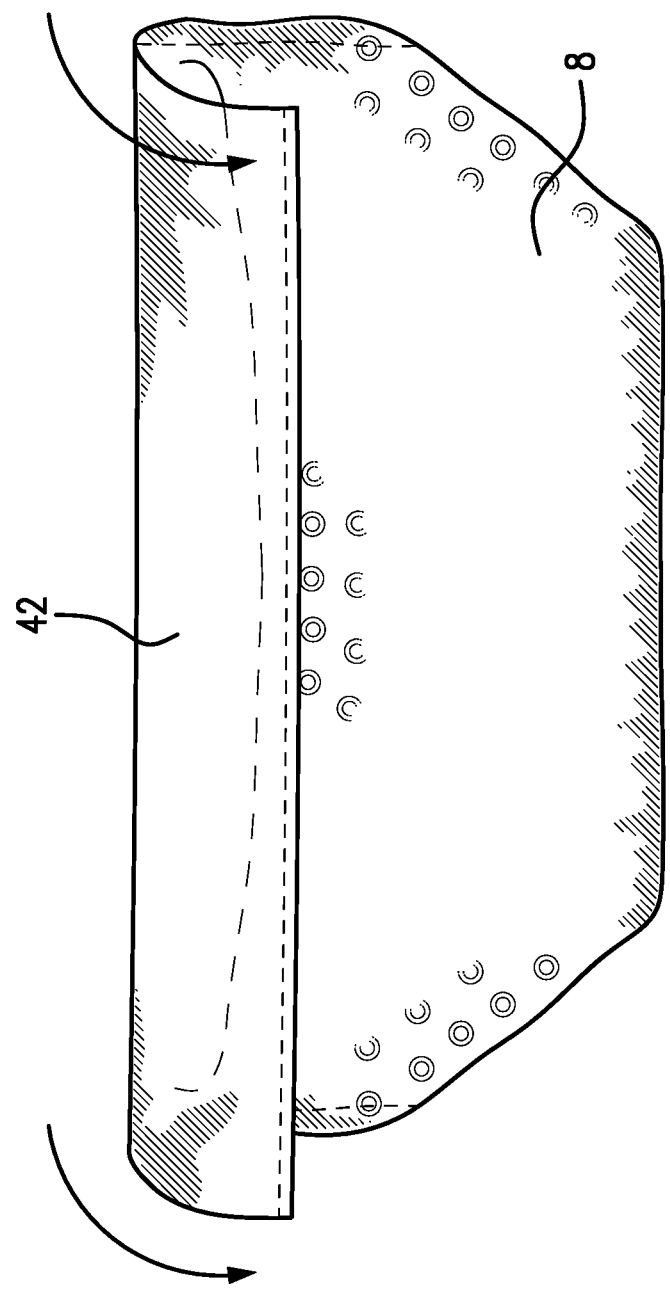
FIG. 14B shows the box liner of FIG. 14A where the extended lip has been closed.
Figure 15:
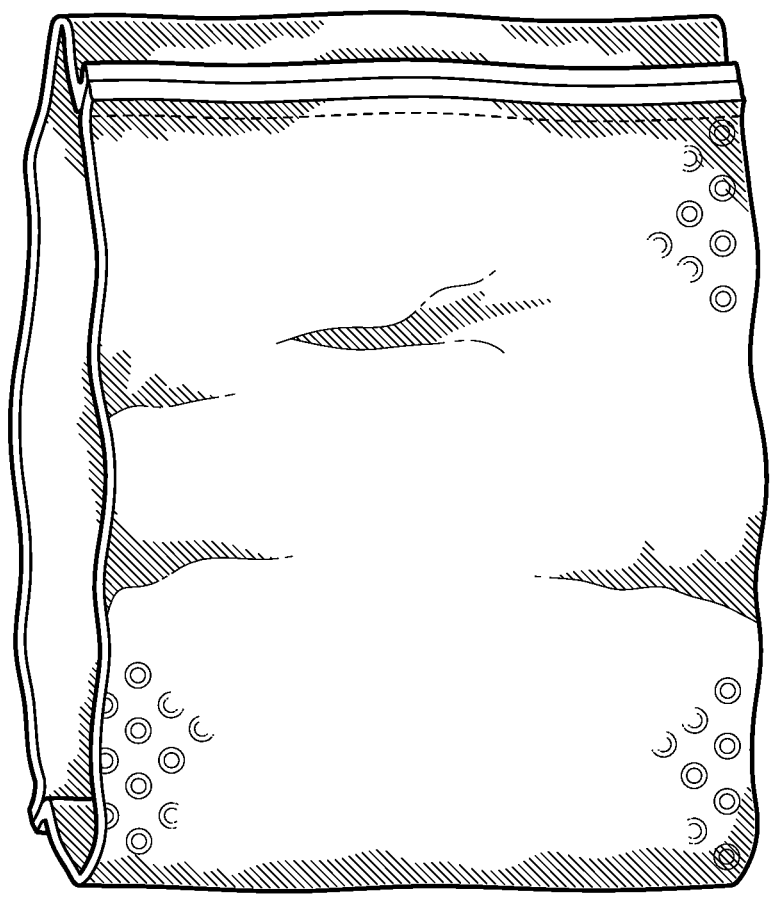
FIG. 15 shows a completed box liner.
Figure 15B:
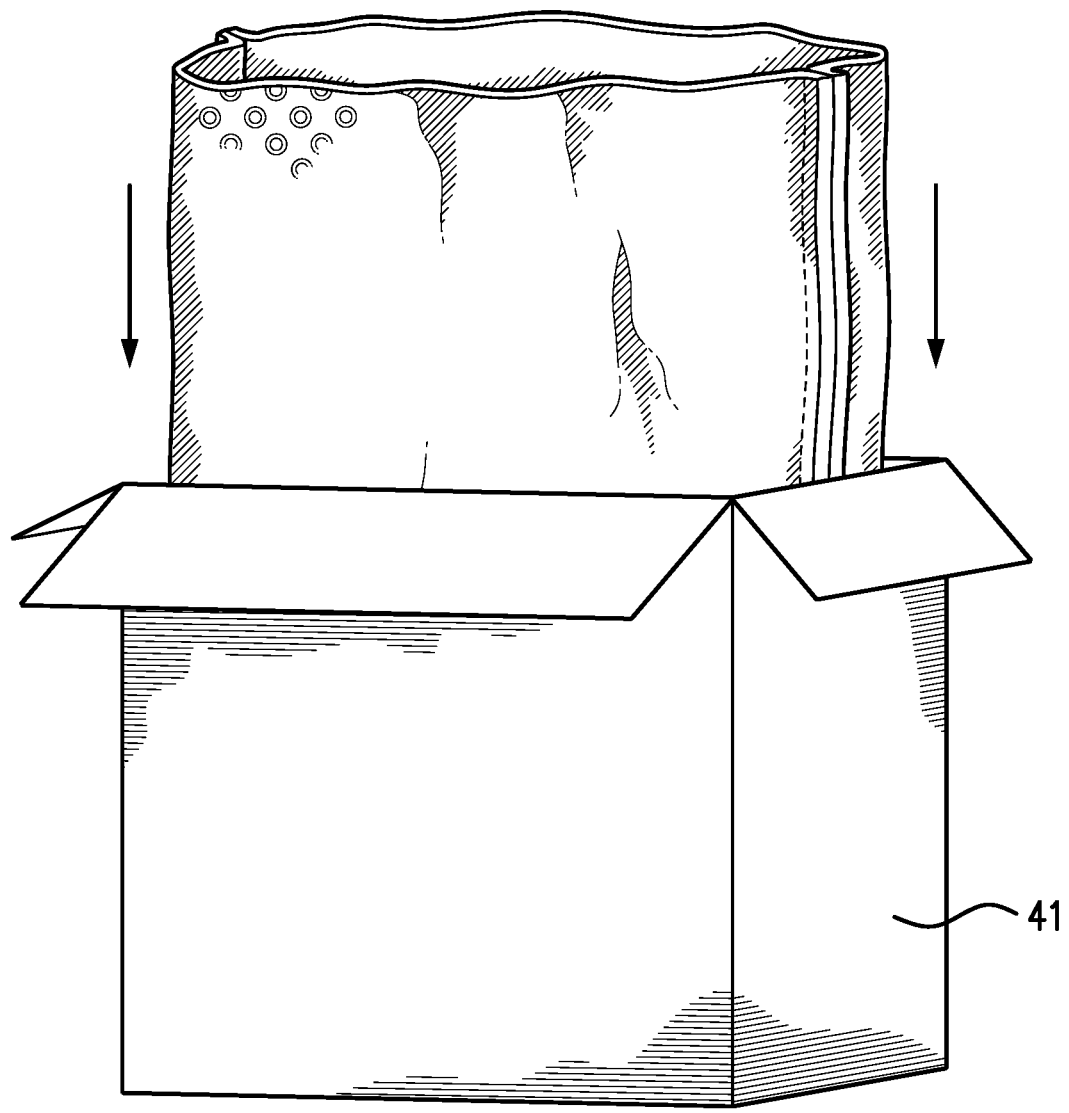
FIG. 15B shows the completed box liner of FIG. 15 being lowered into a carton.

Referring now to FIG. 6, it shows a perspective view of a folded sheet of multilayer cellulose material as in FIG. 2 that is manipulated to form two bottom triangular points by expanding the pouch in FIG. 2 and folding up bottom corners. The article in this format is created by manipulating the article in FIG. 2 by pulling out each corner while also expanding the pouch to form two triangular pointed sections. It has front side/panel 13, first triangular pointed section 14, and second triangular pointed section 15. Side panel 18 is shown along with the intra-panel connection line 17, side panel upper portion 38, side panel lower portion 39, and folded panel connection lines 35. Referring now to FIG. 7, it shows a perspective view of a folded sheet of multilayer cellulose material (expanded) as in FIG. 6 having a front side/panel 13, side panel 18, intra-panel connection line 17, side panel upper portion 38, side panel lower portion 39, bottom panel 19 and folded panel connection lines 35, where the bottom edges are created by removing the folded-up bottom corners, i.e., first triangular pointed section 14 and second triangular pointed section 15. The first and second triangular pointed sections 14 and 15 can be removed using shear cutting and the resulting straight edges must be connected, as shown, e.g., in bottom panel connection 33. This step is repeated on the other side to complete the four bottom edges. Now referring to FIG. 7B, it shows a perspective view of a folded sheet of multilayer cellulose material as in FIG. 6 where a bottom edge is created by expansion of the bag and alternatively folding up bottom corners and therefore creating a bottom edge of a bag, requiring no connecting of free (cut) edges, although the folded up triangular portions may be connected to the sidewall if desired, so they do not encumber the insertion of the article into a carton. It includes an expanded bag where the first triangular pointed section 14 and the second triangular pointed section 15 have been formed by pulling them out, bottom panel 19, side panel 18 along with intra-panel connection line 17, side panel upper portion 38, side panel lower portion 39, and folded panel connection lines 35. As indicated by the arrows, first triangular pointed section 14 and second triangular pointed section 15 are folded up to be aligned with the respective side panels, e.g., side panel 18. Referring now to FIG. 7C, it shows a perspective view of a folded sheet of multilayer cellulose material as in FIG. 7B to form an expanded square bottom of the bag 12, where the bottom corners that are folded are contacted with the side panel of the newly formed bag. It includes front side/panel 13, side panel 18, bottom panel 19, side panel upper portion 38, side panel lower portion 39, folded panel connection lines 35, and folded flap 34 which corresponds to first pointed section 14 (from FIG. 7B) after it has been folded up to contact side panel 18. Optionally, the folded flap 34 can be connected to side panel 18 by sewing, taping or gluing. Not shown is the corresponding folded flap on the other side of the bag. Referring now to FIG. 8, it shows a perspective view of two rolls of multilayer cellulose material being unwound into sheets that can be inserted into a converting process 25. Referring now to FIG. 9 it shows the multilayer cellulose material in FIG. 8 in a first proposed converting method including gluer 21, die cutter 22, and cross cutter 23 to produce connected pouch 24. The converting method yields pouches of the same material with some edges connected and portions removed. More specifically, the closest edge is first connected, resulting in a two-layer web connected at one edge, then there is a cutting of the appropriate dimension on the same connected side. The dimensions of the cut-out correspond to approximately two times the appropriate size of the cutout necessary for one corner of an article. Subsequently, the cutout is bisected in a step that also cuts the two webs in the appropriate length necessary for the proper design of the article. The resulting article is then put into a subsequent process (not pictured) where the two sides above the cut-outs are connected, and as in FIG. 5, bottom edges are fashioned, following the edge connecting steps. Referring now to FIG. 10, it shows the multilayer cellulose material in FIG. 8 in a second converting method including gluer 21, die cutter 22, and cross cutter 23 to produce connected pouch 24. The converting method yields pouches of the same material with some edges connected and portions removed. More specifically, the two side edges edge are first connected, resulting in a two-layer web connected at both edges, then there is a cutting of the appropriate dimension on both sides of the article. The dimensions of the cut-outs correspond to the appropriate size of the cutout necessary for one corner of an article on each side. Subsequently, the cutout is cut at the bottom in a step that also cuts the two webs in the appropriate length necessary for the proper design of the article. The step creates the bottom of the article and the top of the subsequent article. The resulting article is then put into a subsequent process (not pictured) where the two bottom unconnected edges between the two cut-outs are connected, and as in FIG. 5, the bottom edges are fashioned, following the bottom connecting step. Referring now to FIG. 10, it includes gluer 21, die cutter 22 and, cross cutter 23, to produce connected pouch 24. Referring now to FIG. 11, it shows a close up of the edge connecting method in FIGS. 9 and 10. This apparatus can be replaced by a tape application mechanism that provides similar edge connecting as described earlier. The tape mechanisms include tape unwinds, folding devices, forming collars and guides for the enveloping and tabbing, and pressure applicators to properly apply the same. When water-based adhesives such as gum tape are used, a water applicator or moistening device is used to apply water to the tape prior to application. Alternatively, two rolls of tape can be used instead of folding one strip of tape, one roll applied from bottom and one from top. Referring now to FIG. 12, it shows a cross section side view close up of the edge of a stacked two layers of cellulosic material, that are unconnected. End view of tissues 32 and end view of tissues 26 are contacted by edge stacking as shown in FIG. 2 to produce connected edge of tissues 27. Referring now to FIG. 13, shown is a side view close up of the edge of a stacked two layers of cellulosic material, that are connected using a tape device. End view of tissues 28 and end view of tissues 29 are contacted, and tape 30 is applied. Tape 30 is applied and pressed to form tab 31. Referring now to FIG. 14A, shown is a completed extended lip box liner, where front side/panel 13 has been cut or fashioned to form a shorter front side 8, so that back side/panel 36 extends above shorter front side 8. This extended portion of the back side/panel 42 can be folded down over the shorter front side 8. Referring now to FIG. 14B, shown is the extended lip box liner of FIG. 14A, where the extended portion of the back side/panel 42 has been folded down over the shorter front side 8. Referring now to FIG. 15, shown is a completed box liner. Referring now to FIG. 15B, shown is the completed box liner of FIG. 15 being lowered into a carton 41.

Any connecting method above can be used including sewing. Any feature, such as the closure methods mentioned, including top extended lip closure, can be achieved using the automated production methods such as those in FIGS. 9 and 10, by varying the alignment of the webs and/or utilizing unlike web widths.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be affected without departing from the spirit and scope of the invention as described and claimed.

I claim:

1. A recyclable expandable insulating liner comprising:
a web of multilayer cellulose-based material configured to form a one-piece box shape when expanded, comprising four side panels and a bottom panel, wherein each side panel is connected to adjacent side panels and the bottom panel, and at least one of the side panels comprise an intra-panel connection line connecting two sections of the panel, and wherein two side panels comprise an intra-panel connection line and the two side panels are opposite one another.

2. The insulating liner of claim 1 further comprising two bottom panel connections, each connecting the bottom panel to the side panels opposite one another.

3. The insulating liner of claim 1 further comprising two folded flaps, each contacting the side panel opposite one another, wherein each folded flap comprises a pointed triangular section that has been folded up to contact the side panel.

4. The insulating liner of claim 1 wherein the insulating liner is fully recyclable.

5. The insulating liner of claim 1 further comprising a closure device.

6. The insulating liner of claim 1 wherein the intra-panel connection is selected from taping, adhesives or sewing.

7. The insulating liner of claim 6 wherein when the intra-panel connection is taping, the tape material requires compressive force to be attached securely.

8. The insulating liner of claim 1 wherein the multilayer cellulose-based material comprises cellulose tissue materials.

9. The insulating liner of claim 8 wherein the cellulose tissue material is wrinkled or embossed.

* * * * *